US012378340B2

(12) United States Patent
Mahoney et al.

(10) Patent No.: US 12,378,340 B2
(45) Date of Patent: Aug. 5, 2025

(54) CROSSLINKERS AND CURABLE COMPOSITIONS INCLUDING THE SAME

(71) Applicant: 3M INNOVATIVE PROPERTIES COMPANY, St. Paul, MN (US)

(72) Inventors: Wayne S. Mahoney, St. Paul, MN (US); Michael A. Kropp, Cottage Grove, MN (US); Anthony J. Ostlund, Forest Lake, MN (US); Nelson T. Rotto, Woodbury, MN (US); Kristine Klimovica, St. Paul, MN (US); Carol-Lynn Spawn, Stillwater, MN (US); Allan Clemens, St. Paul, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 730 days.

(21) Appl. No.: 17/619,195

(22) PCT Filed: Jun. 10, 2020

(86) PCT No.: PCT/IB2020/055458
§ 371 (c)(1),
(2) Date: Dec. 14, 2021

(87) PCT Pub. No.: WO2020/250154
PCT Pub. Date: Dec. 17, 2020

(65) Prior Publication Data
US 2022/0325022 A1 Oct. 13, 2022

Related U.S. Application Data

(60) Provisional application No. 63/028,024, filed on May 21, 2020, provisional application No. 62/984,923, filed on Mar. 4, 2020, provisional application No. 62/860,973, filed on Jun. 13, 2019.

(51) Int. Cl.
| | |
|---|---|
| *C09J 4/06* | (2006.01) |
| *C08F 220/20* | (2006.01) |
| *C08F 220/28* | (2006.01) |
| *C08F 222/10* | (2006.01) |
| *C08K 3/04* | (2006.01) |
| *C08K 3/34* | (2006.01) |

(52) U.S. Cl.
CPC ........ *C08F 220/282* (2020.02); *C08F 220/20* (2013.01); *C08F 222/1065* (2020.02); *C09J 4/06* (2013.01); *C08K 3/04* (2013.01); *C08K 3/346* (2013.01)

(58) Field of Classification Search
CPC ............ C08F 220/282; C08F 222/1065; C08F 220/20; C09J 4/06; C08K 3/04; C08K 3/346
See application file for complete search history.

(56) References Cited

U.S. PATENT DOCUMENTS

| | | | |
|---|---|---|---|
| 3,347,954 A | 10/1967 | Bredereck | |
| 3,436,359 A | 4/1969 | Hubin | |
| 4,018,851 A | 4/1977 | Baccei | |
| 4,443,587 A | 4/1984 | Schmitt | |
| 4,447,493 A * | 5/1984 | Driscoll | B32B 27/30 |
| | | | 428/458 |
| 4,605,712 A | 8/1986 | Mueller | |
| 4,833,213 A | 5/1989 | Leir | |
| 5,214,119 A | 5/1993 | Leir | |
| 5,252,629 A | 10/1993 | Imai | |
| 5,334,681 A | 8/1994 | Mueller | |
| 5,705,561 A | 1/1998 | Kozakiewicz | |
| 6,284,360 B1 | 9/2001 | Johnson | |
| 7,332,218 B1 | 2/2008 | Gilbert | |
| 7,713,604 B2 | 5/2010 | Yang | |
| 7,718,730 B2 | 5/2010 | Roesler | |
| 8,313,604 B2 | 11/2012 | Oshima | |
| 8,404,787 B2 | 3/2013 | Lutz | |
| 8,415,425 B2 | 4/2013 | Kanai | |
| 8,491,749 B2 | 7/2013 | Gorodisher | |
| 8,545,225 B2 | 10/2013 | Takei | |
| 8,859,683 B2 | 10/2014 | Takahashi | |
| 9,416,299 B2 | 8/2016 | Kropp | |
| 9,890,304 B2 | 2/2018 | Yurt | |

(Continued)

FOREIGN PATENT DOCUMENTS

| | | |
|---|---|---|
| CN | 103342966 | 10/2013 |
| CN | 104449418 | 3/2015 |

(Continued)

OTHER PUBLICATIONS

Bayramoglu, "Preparation of collagen modified photopolymers: a new type of biodegradable gel for cell growth", Journal of Materials Science: Materials in Medicine, Nov. 2010, vol. 21, pp. 761-775.
Cooper, Advances in Polyurethane Biomaterials, 115-147 (2016).
Hoffman, "Tetramethylammonium 3-aminopropyl dimethylsilanolate-aminopropyl dimethylsilanolate—a new catalyst for the synthesis of high purity, high molecular weight α, ω-bis(aminopropyl) polydimethylsiloxanes", Polymer International, 1991, vol. 24, No. 3, pp. 131-138.
Inan, "Preparation of novel UV-curable methacrylated urethane resins from a modified epoxy resin and isocyanatoethylmethacrylate (IEM)", Polymer Bulletin, 2002, vol. 47, pp. 437-444.
Lin, "UV-curable low-surface-energy fluorinated poly(urethane-acrylates)s for biomedical applications," European Polymer Journal, Sep. 2008, vol. 44, No. 9, pp. 2927-2937.

(Continued)

*Primary Examiner* — Jiangtian Xu
(74) *Attorney, Agent, or Firm* — Kathleen B. Gross; Ann Benjamin

(57) ABSTRACT

Provided are novel crosslinkers and curable compositions including such crosslinkers. Bonded constructions including the disclosed curable compositions display high adhesion, elongation, and impact resistance even if the bonded substrate receives no surface treatment prior to bonding. Provided are elastomeric products including the curable compositions, methods of making the same, and uses thereof.

20 Claims, No Drawings

(56) References Cited

U.S. PATENT DOCUMENTS

| | | | |
|---|---|---|---|
| 9,957,408 B2 | 5/2018 | Thompson | |
| 10,344,169 B2 | 7/2019 | Tasaka | |
| 10,544,272 B2 | 1/2020 | Hatakeyama | |
| 10,950,364 B2 | 3/2021 | Hatakeyama | |
| 11,390,776 B2 | 7/2022 | Hajji | |
| 2006/0264573 A1 | 11/2006 | Bennett | |
| 2007/0088110 A1 | 4/2007 | Kohl | |
| 2010/0160557 A1 | 6/2010 | Murofushi | |
| 2011/0039997 A1 | 2/2011 | Papon | |
| 2012/0139138 A1 | 6/2012 | Samuel | |
| 2012/0142867 A1 | 6/2012 | Iwasaki | |
| 2012/0258318 A1 | 10/2012 | Foule | |
| 2012/0301729 A1 | 11/2012 | Schmider | |
| 2013/0130203 A1 | 5/2013 | Velamakanni | |
| 2013/0137064 A1 | 5/2013 | Velamakanni | |
| 2015/0291862 A1 | 10/2015 | Krishnan | |
| 2016/0137893 A1* | 5/2016 | Sherman | C08G 18/5042 560/169 |
| 2017/0135911 A1 | 5/2017 | Craig | |
| 2018/0312613 A1 | 11/2018 | Townsend | |
| 2020/0017623 A1 | 1/2020 | Ye | |
| 2021/0040240 A1 | 2/2021 | Moser | |
| 2021/0238459 A1 | 8/2021 | Shi | |
| 2022/0195093 A1 | 6/2022 | Rotto | |
| 2022/0259469 A1 | 8/2022 | Leone | |

FOREIGN PATENT DOCUMENTS

| | | |
|---|---|---|
| CN | 107325776 | 11/2017 |
| CN | 107639916 | 1/2018 |
| CN | 108192508 | 6/2018 |
| DE | 4025776 | 2/1992 |
| EP | 0493320 | 7/1992 |
| EP | 0670341 | 9/1995 |
| EP | 1141104 | 10/2001 |
| EP | 1529825 | 5/2005 |
| JP | 2000-053906 | 2/2000 |
| JP | 3338331 | 10/2002 |
| JP | 2007-169560 | 7/2007 |
| JP | 2012-111907 | 6/2012 |
| JP | 2016-155892 | 9/2016 |
| JP | 2017-179125 | 10/2017 |
| JP | 2018-168291 | 11/2018 |
| WO | WO82/02048 | 6/1982 |
| WO | WO 2008-013301 | 1/2008 |
| WO | WO 2018-160614 | 9/2018 |
| WO | WO 2022-034521 | 2/2022 |
| WO | WO 2022-101701 | 5/2022 |
| WO | WO 2022-101702 | 5/2022 |
| WO | WO 2022-130339 | 6/2022 |
| WO | WO 2022-130340 | 6/2022 |
| WO | WO 2023-007401 | 2/2023 |

OTHER PUBLICATIONS

Mazurek, "Novel materials based on silicone-acrylate copolymer networks", Journal of Applied Polymer Science, 2001, vol. 80, pp. 159-180.

Sarac, "Redox polymerization", Progress in Polymer Science, Oct. 1999, vol. 24, No. 8, pp. 1149-1204.

Yilmaz, "Effects of nonreactive resins on the properties of a UV-curable methacrylated urethane resin", Journal of Applied Polymer Science, Aug. 1998, vol. 69, No. 9, pp. 1837-1845.

International Search Report for PCT International Application No. PCT/IB2020/055458, mailed on Jul. 20, 2020, 4 pages.

\* cited by examiner

CROSSLINKERS AND CURABLE COMPOSITIONS INCLUDING THE SAME

TECHNICAL FIELD

Crosslinkers and curable compositions, cured compositions, and articles that include the same are described.

BACKGROUND

Structural adhesives are known to be useful for bonding one substrate to another, e.g., a metal to a metal, a metal to a plastic, a plastic to a plastic, a glass to a glass. Structural adhesives are attractive alternatives to mechanical joining methods, such as riveting or spot welding, because structural adhesives distribute load stresses over larger areas rather than concentrating such stresses at a few points. Structural adhesives may also produce cleaner and quieter products because they can dampen vibration and reduce noise. Additionally, structural adhesives can be used to bond a variety of materials, sometimes without extensive surface preparation.

SUMMARY

In one aspect, provided is a crosslinker comprising:
a compound represented by the formula:

wherein each $R^1$ is independently selected from a functional group represented by the formula:

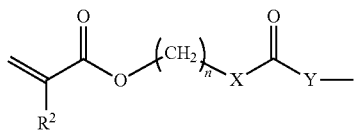

wherein:
each $R^2$ is independently hydrogen or methyl;
n is an integer from 1 to 5, inclusive;
X is O, S, or NH; and
Y is a single bond or a divalent group represented by the formula:

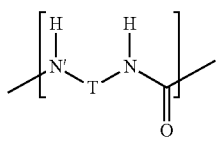

wherein:
N' is a nitrogen bonded to the carbonyl carbon of $R^1$; and
T is a divalent group selected from the group consisting of a linear alkylene, a cyclic alkylene, an unsubstituted arylene, a substituted arylene, and combinations thereof;
q is an integer of at least 2; and
L is an q-valent organic polymer comprising:
a monomer unit a) represented by the formula:

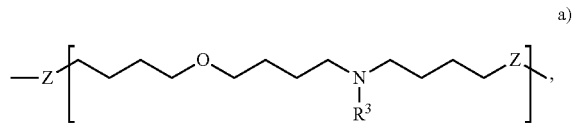

wherein $R^3$ is a hydrogen or a Z-terminated alkyl or heteroalkylene chain, wherein each Z-terminated chain may independently include a linkage selected from the group consisting of a secondary amino linkage, a tertiary amino linkage, an ether linkage, and combinations thereof, and wherein each Z is independently O, S, or NH; and
a monomer unit b) represented by the formula:

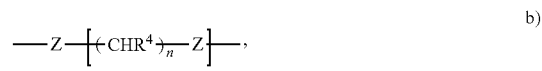

wherein n is an integer from 1 to 5, inclusive, each $R^4$ is independently hydrogen or alkyl, and each Z is independently O, S, or NH.

In another aspect, provided is curable compositions comprising:
a monofunctional monomer;
a cure initiator system; and
a compound represented by the formula:

wherein each $R^1$ is independently selected from a functional group represented by the formula:

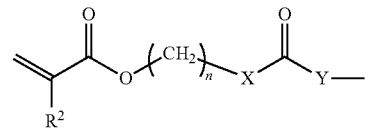

wherein:
each $R^2$ is independently hydrogen or methyl;
n is an integer from 1 to 5, inclusive;
X is O, S, or NH; and
Y is a single bond or a divalent group represented by the formula:

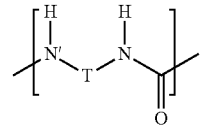

wherein:
N' is a nitrogen bonded to the carbonyl carbon of R'; and
T is a divalent group selected from the group consisting of a linear alkylene, a cyclic alkylene, an unsubstituted arylene, a substituted arylene, and combinations thereof;
q is an integer of at least 2; and L is an q-valent organic polymer having a number average molecular weight of from 4000 to 54000 grams per mole versus a polystyrene standard and comprising a monomer unit selected from the group consisting of monomer units represented by the formulas:

a)

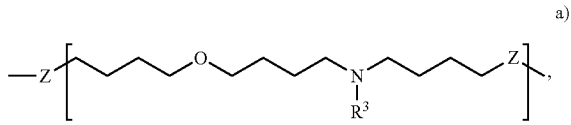

wherein $R^3$ is a hydrogen or a Z-terminated alkyl or heteroalkylene chain, wherein each Z-terminated chain may independently include a linkage selected from the group consisting of a secondary amino linkage, a tertiary amino linkage, an ether linkage, and combinations thereof, and wherein each Z is independently O, S, or NH;

c)

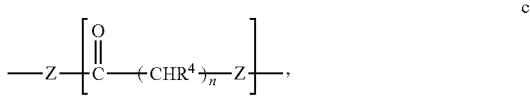

wherein n is an integer from 1 to 5, inclusive, each $R^4$ is independently hydrogen or alkyl, and each Z is independently O, S, or NH;

d)

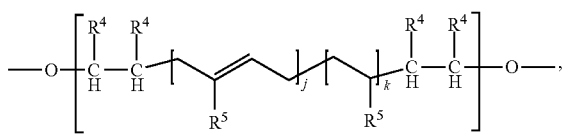

wherein j is a whole number less than or equal to 30, k is a whole number less than or equal to 30, each $R^4$ is independently hydrogen or alkyl, and each $R^5$ is independently a $C_{10}$ to $C_{15}$ alkyl group or a $C_{10}$ to $C_{15}$ alkenyl group, wherein j and k are not both zero, and wherein the moieties having the j and k subscripts are distributed randomly in the carbon chain;

e)

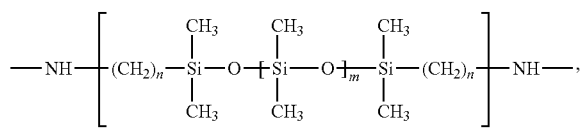

wherein m is an integer from 10 to 330 inclusive, n is an integer from 1 to 5, inclusive; and mixtures thereof, wherein the q-valent organic polymer L comprises less than 26000 grams per mole versus a polystyrene standard of monomer unite) if it is present.

In another aspect, provided is a method of bonding a first substrate to a second substrate, the method comprising:
mixing a curable composition of the present disclosure with an accelerator to form an adhesive composition;
applying the adhesive composition to at least a portion of one surface of the first substrate;
covering the adhesive composition at least partially with at least a portion of one surface of the second substrate; and
allowing the adhesive composition to cure.

In another aspect, provided is an elastomeric product prepared from at least one of the crosslinker or the curable composition disclosed herein.

In another aspect, provided is a bonded article including the elastomeric product bonded to a substrate.

In another aspect, provided is a method of debonding a first substrate bonded to a second substrate with a bead of the elastomeric. The method includes pulling the bead away from at least one of the first substrate or the second substrate, wherein the bead stretchably releases from at least one of the first substrate or the second substrate.

The term "alkyl" refers to a monovalent group that is a radical of an alkane, which is a saturated hydrocarbon. The alkyl can be linear, branched, cyclic, or combinations thereof and typically has 1 to 20 carbon atoms. Examples of alkyl groups include, but are not limited to, methyl, ethyl, n-propyl, isopropyl, n-butyl, isobutyl, tert-butyl, n-pentyl, n-hexyl, cyclohexyl, n-heptyl, n-octyl, and ethylhexyl.

The term "alkylene" refers to a divalent group that is a radical of an alkane. The alkylene can be straight-chained, branched, cyclic, or combinations thereof. The alkylene typically has 1 to 20 carbon atoms. The radical centers of the alkylene can be on the same carbon atom (i.e., an alkylidene) or on different carbon atoms.

The term "alkoxy" refers to a monovalent group of formula —OR where R is an alkyl.

The term "arylene" refers to a polyvalent, aromatic, such as phenylene, naphthalene, and the like.

The term "heteroalkylene" refers to an alkylene having one or more —CH$_2$— groups replaced with a thio, oxy, or —NR$^b$— where R$^b$ is hydrogen or alkyl. The heteroalkylene can be linear, branched, cyclic, or combinations thereof. Exemplary heteroalkylene include alkylene oxides or poly (alkylene oxides). That is, the heteroalkylenes include at least one group of formula —(R—O)— where R is an alkylene.

The term "(meth)acrylate" or "(meth)acrylic acid" is used herein to denote the corresponding acrylate and methacrylate. Thus, for instance, the term "(meth)acrylic acid" covers both methacrylic acid and acrylic acid, and the term "(meth) acrylate" covers both acrylates and methacrylates. The (meth)acrylate or the (meth)acrylic acid may consist only of the methacrylate or methacrylic acid, respectively, or may consist only of the acrylate or the acrylic acid, respectively, yet may also relate to a mixture of the respective acrylate and methacrylate (or acrylic acid and methacrylic acid).

The phrase "comprises at least one of" followed by a list refers to comprising any one of the items in the list and any combination of two or more items in the list. The phrase "at least one of" followed by a list refers to any one of the items in the list or any combination of two or more items in the list.

As used herein, the term "and/or" is used to indicate one or both stated cases may occur, for example A and/or B includes, (A and B) and (A or B).

As used herein, the term "room temperature" refers to a temperature in the range of 20° C. to 25° C.

As used herein, the term "substantially free" means less than 1% by weight, less than 0.5% by weight, or less than 0.1% by weight, of a given component in a composition based on the total weight of the composition.

Features and advantages of the present disclosure will be further understood upon consideration of the detailed description as well as the appended claims.

It should be understood that numerous other modifications and embodiments can be devised by those skilled in the art, which fall within the scope of the principles of the disclosure.

DETAILED DESCRIPTION

Though known structural adhesives may have good high-temperature performance and durability, the rigid bond these structural adhesives create after curing can lead to poor impact resistance of the bonded parts and subsequent bond failure. Additionally, adhesives having rigid bonds have high and uneven stresses distributed throughout the bond, with the stress at the edges of the bond typically higher than the stress in the middle of the bond. The high stress of rigid structural adhesives can lead to the undesirable distortion of bonded materials, i.e., bond-line read through, which can be visually observed particularly when bonding larger parts, for example, automotive panels.

One approach used in the industry to enhance flexibility and toughness of structural adhesives is the incorporation of elastomeric materials that can be dissolved or dispersed in the adhesive composition. Examples of such elastomeric materials may include a methyl methacrylate-butadiene-styrene copolymer ("MBS"), an acrylonitrile-styrene-butadiene copolymer, a linear polyurethane, an acrylonitrile-butadiene rubber, a styrene-butadiene rubber, a chloroprene rubber, a butadiene rubber, and natural rubbers. These elastomeric material additives can, however, lead to high viscosity of the liquid adhesive compositions that may result in handling challenges during use. Additionally, in the case of butadiene or other conjugated diene rubbers the elastomeric material additives may reduce the resistance to oxidation of the structural adhesive that may lead to bond failure.

The present disclosure provides curable compositions that are substantially free of liquid rubber materials, and yet yield bonded constructions displaying high adhesion (i.e., >1000 psi in a typical overlap shear test), elongation (i.e., values greater than 50%, greater than 100%, or greater than 400%), and impact resistance (i.e., >2 J) even if the bonded substrate (e.g., glass, metal, polymer) receives no surface treatment (e.g., corona, flame, abrasion) prior to bonding, due to the inclusion of novel crosslinkers described below. Curable compositions in embodiments of the present disclosure may further have the advantages of providing sealants that resist hydrolysis upon aging with heat and/or humidity, yielding bonded constructions displaying little to no bond-line read through, providing adhesive compositions exhibiting stretch release, which may enable rework of parts bonded with these adhesives. In some cases, adhesives prepared from the crosslinker or composition of the present disclosure allow components to be disassembled with heat and non-wire string.

Crosslinkers

Crosslinkers of the present disclosure are compounds represented by the formula:

wherein each $R^1$ is independently selected from a functional group represented by the formula:

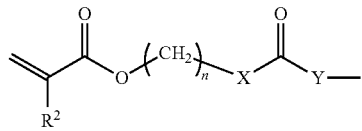

wherein:
each $R^2$ is independently hydrogen or methyl;
n is an integer from 1 to 5, inclusive;
X is O, S, or NH; and
Y is a single bond or a divalent group represented by the formula:

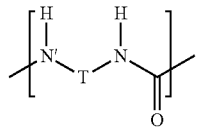

wherein:
N' is a nitrogen bonded to the carbonyl carbon of $R^1$; and
T is a divalent group selected from the group consisting of a linear alkylene, a cyclic alkylene, an unsubstituted arylene, a substituted arylene, and combinations thereof;
q is an integer of at least 2; and
L is an q-valent organic polymer comprising a monomer unit selected from the group consisting of monomer units represented by the formulas:

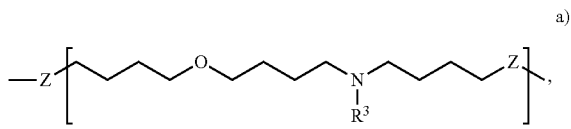

wherein $R^3$ is a hydrogen or a Z-terminated alkyl or heteroalkylene chain, wherein each Z-terminated chain may independently include a linkage selected from the group consisting of a secondary amino linkage, a tertiary amino linkage, an ether linkage, and combinations thereof, and wherein each Z is independently O, S, or NH;

wherein n is an integer from 1 to 5, inclusive, each $R^4$ is independently hydrogen or alkyl, and each Z is independently O, S, or NH.

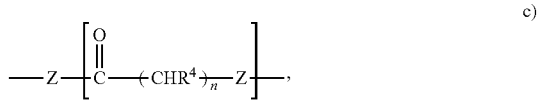

wherein n is an integer from 1 to 5, inclusive, each $R^4$ is independently hydrogen or alkyl, and each Z is independently O, S, or NH;

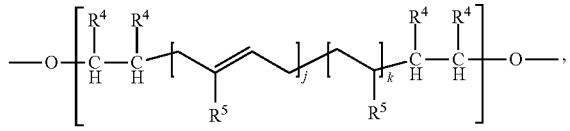
d)

wherein j is a whole number less than or equal to 30, k is a whole number less than or equal to 30, each $R^4$ is independently hydrogen or alkyl, and each $R^5$ is independently a $C_{10}$ to $C_{15}$ alkyl group or a $C_{10}$ to $C_{15}$ alkenyl group, wherein j and k are not both zero, and wherein the moieties having the j and k subscripts are distributed randomly in the carbon chain;

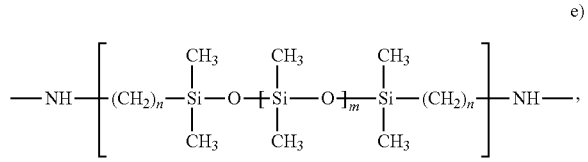
e)

wherein m is an integer from 10 to 330 inclusive, n is an integer from 1 to 5, inclusive; and mixtures thereof, wherein the q-valent organic polymer L has a number average molecular weight of less than 26000 grams per mole versus a polystyrene standard of monomer unit e) if it is present.

In some embodiments, L further comprises a monomer unit selected from the group consisting of monomer units represented by the formulas:

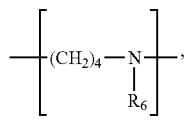
f)

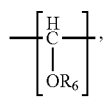
g)

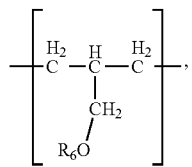
h)

and combinations thereof, wherein each $R^6$ is independently a hydrogen, a monomer unit selected from the group consisting of monomer units a)-e) and a Z-terminated alkyl chain, wherein the Z-terminated alkyl chain may include a linkage selected from the group consisting of a secondary amino linkage, a tertiary amino linkage, an ether linkage, and combinations thereof, and wherein Z is O, S, or NH, where it is understood that monomer units f), g), and h) are not located at a terminus of L if they are present.

In some embodiments, L further comprises a monomer unit represented by the formula:

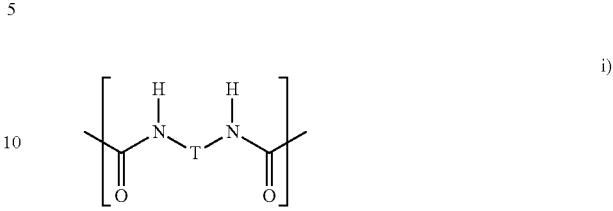
i)

wherein T is a divalent group selected from the group consisting of a linear alkylene, a cyclic alkylene, an unsubstituted arylene, a substituted arylene, and combinations thereof. In such embodiments, L may be a block co-polymer having the general structure A-B-A-B-A, where each A represents a homopolymer including monomer units of formula b), wherein n=4, Z is O, and having a number average molecular weight of 2500 to 3500 grams per mole (e.g., 2900 grams per mole) and each B represents a monomer unit represented by formula i), where it is understood that monomer unit i) is not located at a terminus of L if it is present. In some embodiments, L may have a number average molecular weight of 4000-40000 grams per mole, or 8000 to 30000 grams per mole.

With respect to q-valent organic polymer L, it is understood that L may be a homopolymer or a copolymer (e.g., a block copolymer, a random copolymer). For example, a homopolymer L would include only one type of monomer unit, i.e., a), b), c), d), or e) in the polymer chain. A block copolymer could include, for example, a sequence of a) monomer units adjacent a sequence of b) monomer units forming the polymer chain. A random copolymer could include, for example, some first number of b) monomer units randomly interspersed with some second number of a) monomer units forming the polymer chain.

Crosslinkers of the present disclosure represented by the formula $LR_q^1$ may be prepared by methods known to those of ordinary skill in the relevant arts and by methods as described, for example, in Cooper, S. L. and Guan, J. (Eds) Advances in Polyurethane Biomaterials, Chapter 4, (Elsevier Ltd., 2016) and Lin et al., "UV-curable low-surface-energy fluorinated poly(urethane-acrylates)s for biomedical applications," European Polymer Journal, Vol. 44, pp. 2927-2937 (2008). For example, a crosslinker including monomer units represented by the formulas a) and b) may be prepared by the reaction of polyether polyprimary polyamines, either obtained from 3M Company (St. Paul, MN) under the trade designation DYNAMAR HC-1101 or prepared as described in U.S. Pat. No. 3,436,359 (Hubin et al.), with 2-isocyanatoethyl methacrylate ("IEM").

In some embodiments, the q-valent organic polymer L comprises 10 wt. % to 20 wt. % of monomer unit a) monomers and at least 70 wt. % of monomer unit b) monomers. In some embodiments, the q-valent organic polymer L comprises less than 7 wt. %, less than 6 wt. %, less than 5 wt. %, less than 4 wt. %, less than 3 wt. %, less than 2 wt. %, less than 1 wt. %, or less than 0.5 wt. % of monomer unit a) monomers wherein $R^3$ is not hydrogen. In some embodiments, the q-valent organic polymer L has a number average molecular weight of from 4000 to 54000 grams per mole versus a polystyrene standard.

Curable Compositions

Curable compositions of the present disclosure generally include a crosslinker compound represented by the formula $LR^1_q$, a monofunctional monomer, and a cure initiator system and may be prepared by methods known to those of ordinary skill in the relevant arts.

Curable compositions of the present disclosure generally include 2 wt. % to 60 wt. % or 5 wt. % to 50 wt. % of the compound represented by the formula $LR^1_q$ (described above).

Monofunctional Monomers

The curable composition further comprises a monofunctional monomer. Examples of monofunctional (meth)acrylate monomers useful in embodiments of the present disclosure include 2-phenoxyethyl (meth)acrylate, cyclohexyl (meth)acrylate, benzyl (meth)acrylate, isobornyl (meth)acrylate, acid-functional monomers such as (meth)acrylic acid, alkoxylated lauryl (meth)acrylate, alkoxylated phenol (meth)acrylate, alkoxylated tetrahydrofurfuryl (meth)acrylate, caprolactone (meth)acrylate, cyclic trimethylolpropane formyl (meth)acrylate, ethylene glycol methyl ether methacrylate, ethoxylated nonyl phenol (meth)acrylate, isodecyl (meth)acrylate, isooctyl (meth)acrylate, lauryl (meth)acrylate, octadecyl (meth)acrylate (stearyl (meth)acrylate), tetrahydrofurfuryl (meth)acrylate, tridecyl (meth)acrylate, tetrahydrofurfuryl (meth)acrylate, allyl (meth)acrylate, methyl (meth)acrylate, ethyl (meth)acrylate, n-propyl (meth)acrylate, n-butyl (meth)acrylate, isobutyl (meth)acrylate, n-hexyl (meth)acrylate, 2-ethylhexyl (meth)acrylate, n-octyl (meth)acrylate, n-decyl (meth)acrylate, n-dodecyl (meth) acrylate, 2-hydroxyethyl (meth)acrylate, 2- and 3-hydroxypropyl (meth)acrylate, 2-methoxyethyl(meth)acrylate, 2-ethoxyethyl (meth)acrylate, 2- or 3-ethoxypropyl (meth)acrylate, 2-(2-ethoxyethoxy)ethyl acrylate, glycidyl (meth)acrylate, phosphonate-functional (meth)acrylate monomers (for example, the SIPOMER PAM resins from Solvay Specialty Polymers USA, LLC or those from Miwon North America (Exton, PA) under the trade designation MIRAMER SC1400 and MIRAMER SC1400A), N-(2-(2-oxo-1-imidazolidinypethyl)-meth acrylamide (methacrylamidoethyl ethyleneurea ("MAEEU") available from Solvay Specialty Polymers USA, LLC. under the trade designation SIPOMER WAM II), and the like, and combinations thereof.

Specific examples of monoacrylate monomers useful in embodiments of the present disclosure include isobornyl acrylate (commercially available from SARTOMER under the trade designation SR506, or from Evonik Performance Materials GmbH under the trade designation VISIOMER IBOA), isobornyl methacrylate (commercially available from Sartomer under the trade name SR423A or from Evonik Performance Materials GmbH under the trade name VISIOMER IBOMA), 2-phenoxyethyl methacrylate (commercially available from SARTOMER under the trade designation SR340), cyclohexyl methacrylate (commercially available from Evonik Performance Materials GmbH under the trade designation VISIOMER c-HMA), benzyl methacrylate (commercially available from Miwon North America (Exton, PA) under the trade designation MIRAMER M1183), phenyl methacrylate (commercially available from Miwon North America (Exton, PA) under the trade designation MIRAMER M1041), allyl methacrylate (commercially available from Evonik Performance Materials GmbH under the trade designation VISIOMER AMA), 2-hydroxyethyl methacrylate (commercially available from Evonik Performance Materials GmbH under the trade designation VISIOMER HEMA 97 and HEMA 98), hydroxypropyl methacrylate (commercially available from Evonik Performance Materials GmbH under the trade designation VISIOMER HPMA 97 and HPMA 98), ultra-high purity 2-hydroxyethyl methacrylate (commercially available from Evonik Performance Materials GmbH under the trade designation VISIOMER UHP HEMA), methyl methacrylate (commercially available from Evonik Performance Materials GmbH under the trade designation VISIOMER MMA), methacrylic acid (commercially available from Evonik Performance Materials GmbH under the trade designation VISIOMER GMAA), n-butyl methacrylate (commercially available from Evonik Performance Materials GmbH under the trade designation VISIOMER n-BMA), isobutyl methacrylate (commercially available from Evonik Performance Materials GmbH under the trade designation VISIOMER i-BMA), glycerol formal methacrylate (commercially available from Evonik Performance Materials GmbH under the trade designation VISIOMER GLYFOMA), 2-(2-butoxyethoxy)ethyl methacrylate (commercially available from Evonik Performance Materials GmbH under the trade designation VISIOMER BDGMA), lauryl methacrylate (commercially available from BASF (Florham Park, NJ) under the trade designation LMA 1214 F, polypropylene glycol monomethacrylate (commercially available from Miwon North America (Exton, PA) under the trade designation MIRAMER M1051), β-methacryloyl oxyethyl hydrogen succinate (commercially available from Shin-Nakamura Co. LTD (Arimoto, Japan) under the trade designation NK ESTER SA), 2-isocyanatoethyl methacrylate (commercially available from Showa Denko K. K. (Tokyo, Japan) under the trade designation KarenzMOI), 2-(methacryloyloxy)ethyl phthalate mono ((HEMA phthalate) commercially available as product number X-821-2000 from ESSTECH, Inc., Essington, PA), 2-(methacroyloxy)ethyl maleate ((HEMA maleate) commercially available as product number X-846-0000 from ESSTECH, Inc., Essington, PA), methoxy diethylene glycol methacrylate (commercially available from Shin-Nakamura Co. LTD (Arimoto, Japan) under the trade designation M-20G, methoxy triethylene glycol methacrylate (commercially available from Shin-Nakamura Co. LTD (Arimoto, Japan) under the trade designation M-30G, methoxy tetraethylene glycol methacrylate (commercially available from Shin-Nakamura Co. LTD (Arimoto, Japan) under the trade designation M-40G, methoxy tripropylene glycol methacrylate (commercially available from Shin-Nakamura Co. LTD (Arimoto, Japan) under the trade designation M-30PG, butoxy diethylene glycol methacrylate (commercially available from Shin-Nakamura Co. LTD (Arimoto, Japan) under the trade designation B-20G), phenoxy ethylene glycol methacrylate (commercially available from Shin-Nakamura Co. LTD (Arimoto, Japan) under the trade designation PHE-1G), phenoxy diethylene glycol methacrylate (commercially available from Shin-Nakamura Co. LTD (Arimoto, Japan) under the trade designation PHE-2G), dicyclopentenyloxyethyl methacrylate (commercially available from Hitachi Chemical (Tokyo, Japan) under the trade designation FANCRYL FA-512M), dicyclopentanyl methacrylate (commercially available from Hitachi Chemical (Tokyo, Japan) under the trade designation FANCRYL FA-513M), isobornyl cyclohexyl methacrylate (commercially available from Designer Molecules, Inc. (San Diego, CA) as product MM-304), 4-methacryloxyethyl trimellitic anhydride (commercially available from Designer Molecules, Inc. (San Diego, CA) as product A-304, 2-methacryloxyethyl phenyl urethane (commercially available from Polysciences, Inc. (Warrington, PA), trifluoroethyl methacrylate (commercially available from Hampford Research Inc. (Stratford, CT), methacrylamide (commercially available from Evonik Performance Materials GmbH under the trade designation VISIOMER MAAmide), 2-dimethylaminoethyl methacrylate (commercially available from Evonik Performance Materials GmbH under the trade designation VISIOMER MADAME), 3-dimethylaminopropyl methacrylamide (commercially available from Evonik Performance Materials GmbH under the trade designation VISIOMER DMAPMA), and the like, and combinations thereof.

In some embodiments, the monofunctional (meth)acrylate monomer can act as a reactive diluent for oligomers.

In some embodiments, the monofunctional monomer is selected from the group consisting of methyl methacrylate, 2-hydroxyethyl methacrylate, methacrylic acid, 2-(2-butoxyethoxy)ethyl methacrylate, glycerol formal methacrylate, lauryl methacrylate, cyclohexyl methacrylate, phenyl methacrylate, and combinations thereof.

In embodiments of the present disclosure, the curable composition commonly comprises 49 wt. % to 97 wt. % of the monofunctional monomer.

Cure Initiator System

The curable composition further comprises a cure initiator system. In some embodiments, the cure initiator system is a redox initiator system, as one-electron transfer redox reactions may be an effective method of generating free radicals under mild conditions. Redox initiator systems have been described, for example, in Prog. Polym. Sci. 24 (1999) 1149-1204.

In some embodiments, the redox initiator system is a blend of a peroxide with an amine, where the polymerization is initiated by the decomposition of the organic peroxide activated by the redox reaction with amine reducing agent. Typically, the peroxide is benzoyl peroxide, and the amine is a tertiary amine. Aromatic tertiary amines are the most effective compounds to generate the primary radicals, with N,N-dimethyl-4-toluidine ("DMT") being the most common amine reducing agent.

In some embodiments, the redox cure initiator system comprises a barbituric acid derivative and a metal salt. In some embodiments, the barbituric acid/metal salt cure initiator system may further comprise an organic peroxide, an ammonium chloride salt (e.g., benzyl tributylammonium chloride), or a mixture thereof.

Examples of cure initiator systems based on barbituric acid include redox initiator systems having (i) a barbituric acid derivative and/or a malonyl sulfamide, and (ii) an organic peroxide, selected from the group consisting of the mono- or multifunctional carboxylic acid peroxide esters. There can be used as barbituric acid derivatives, for example, 1,3,5-trimethylbarbituric acid, 1,3,5-triethylbarbituric acid, 1,3-dimethyl-5-ethylbarbituric acid, 1,5-dimethylbarbituric acid, 1-methyl-5-ethylbarbituric acid, 1-methyl-5-propylbarbituric acid, 5-ethylbarbituric acid, 5-propylbarbituric acid, 5-butylbarbituric acid, 1-benzyl-5-phenylbarbituric acid, 1-cyclohexyl-5-ethylbarbituric acid and the thiobarbituric acids mentioned in the German patent application DE-A-42 19 700.

The barbituric acids and barbituric acid derivatives described in U.S. Pat. No. 3,347,954 (Bredereck et al.) and U.S. Pat. No. 9,957,408 (Thompson), as well as the malonyl sulfamides disclosed in the European patent specification EP-B-0 059 451, may be useful in embodiments of the present disclosure. Examples of malonyl sulfamides include 2,6-dimethyl-4-isobutylmalonyl sulfamide, 2,6-diisobutyl-4-propylmalonyl sulfamide, 2,6-dibutyl-4-propylmalonyl sulfamide, 2,6-dimethyl-4-ethylmalonyl sulfamide or 2,6-dioctyl-4-isobutylmalonyl sulfamide.

The barbituric acid-based redox initiator systems typically contain mono- or multifunctional carboxylic acid peroxyesters as organic peroxides. Carbonic peroxyesters are also included among the multifunctional carboxylic acid peroxyesters within the meaning of the present disclosure. Suitable examples include carbonic-diisopropyl-peroxydiester, neodecanoic acid-tertiary-butyl-peroxyester, neodecanoic acid-tertiary-amyl-peroxyester, maleic acid-tertiary-butyl-monoperoxyester, benzoic acid-tertiary-butyl-peroxyester, 2-ethylhexanoic acid-tertiary-butyl-peroxyester, 2-ethylhexanoic acid-tertiary-amyl-peroxyester, carbonic-monoisopropylester-monotertiary-butyl-peroxyester, carbonic-dicyclohexyl-peroxyester, carbonic dimyristyl-peroxyester, carbonic dicetyl peroxyester, carbonic-di(2-ethylhexyl)-peroxyester, carbonic-tertiary-butyl-peroxy-(2-ethylhexyl)ester or 3,5,5-trimethyl-hexanoic acid-tertiary-butyl-peroxyester, benzoic acid-tertiary-amyl-peroxyester, acetic acid-tertiary-butyl-peroxyester, carbonic-di(4-tertiary-butyl-cyclohexyl)-peroxyester, neodecanoic acid-cumene-peroxyester, pivalic acid-tertiary-amyl-peroxyester and pivalic acid tertiary-butyl-peroxyester.

In particular, carbonic-tertiary-butyl-peroxy-(2-ethylhexyl)ester (commercially available from Arkema, Inc. (King of Prussia, PA) under the trade designation LUPEROX TBEC) or 3,5,5-trimethyl-hexanoic acid-tertiary-butyl-peroxyester (commercially available from Arkema, Inc. (King of Prussia, PA) under the trade designation LUPEROX 270) can be used as organic peroxides according to embodiments of the present disclosure.

Metal salts that may be used with the barbituric acid derivative can include transition metal complexes, especially salts of cobalt, manganese, copper, and iron. When the metal salt is a copper compound, the salt may possess the general formula $CuX_n$, where X is an organic and/or inorganic anion and n=1 or 2. Examples of suitable copper salts include copper chloride, copper acetate, copper acetylacetonate, copper naphthenate, copper salicylate or complexes of copper with thiourea or ethylenediaminetetraacetic acid, and mixtures thereof. In some embodiments, the copper compound is copper naphthenate.

Another redox initiator system suitable for use in embodiments of the present disclosure comprises an inorganic peroxide, an amine-based reducing agent, and an accelerator, where the amine may be an aromatic and/or aliphatic amine, and the polymerization accelerator is at least one selected from the group consisting of sodium benzenesulfinate, sodium p-toluenesulfinate, sodium 2,4,6-trisopropyl benzenesulfinate, sodium sulfite, potassium sulfite, calcium sulfite, ammonium sulfite, sodium bisulfate, and potassium bisulfate. An example of an inorganic peroxide useful in this system is peroxodisulfate as described in U.S. Pat. No. 8,545,225 (Takei, et al.).

In some embodiments, the curable composition includes a cure initiator system comprising a metal salt (e.g., copper naphthenate) and an ammonium salt (e.g., benzyl tributylammonium chloride). In some embodiments, curable composition includes a cure initiator system comprising a barbituric acid derivative and a metal salt and optionally comprising at least one of an organic peroxide and an ammonium chloride salt.

The curable composition may also comprise at least one photoinitiator, meaning that the initiator is activated by light, generally ultraviolet (UV) light, although other light sources could be used with the appropriate choice of initiator, such as a visible-light initiator or an infrared-light initiator. Typically, UV photoinitiators are used.

Useful photoinitiators include those known as useful for photocuring free-radically polyfunctional (meth)acrylates. Exemplary photoinitiators include benzoin and its derivatives such as alpha-methylbenzoin; alpha-phenylbenzoin; alpha-allylbenzoin; alpha benzylbenzoin; benzoin ethers such as benzil dimethyl ketal (e.g., "OMNIRAD BDK" from IGM Resins USA Inc., St. Charles, IL), benzoin methyl ether, benzoin ethyl ether, benzoin n-butyl ether; acetophenone and its derivatives such as 2-hydroxy-2-methyl-1-phenyl-1-propanone (e.g., available under the trade designation OMNIRAD 1173 from IGM Resins USA Inc., St. Charles, IL) and 1-hydroxycyclohexyl phenyl ketone (e.g., available under the trade designation OMNIRAD 184 from IGM Resins USA Inc., St. Charles, IL); 2-methyl-1-[4-(methylthio)phenyl]-2-(4-morpholinyl)-1-propanone (e.g., available under the trade designation OMNIRAD 907 from IGM Resins USA Inc., St. Charles, IL); 2-benzyl-2-(dimethylamino)-1-[4-(4-morpholinyl)phenyl]-1-butanone (e.g., available under the trade designation OMNIRAD 369 from IGM Resins USA Inc., St. Charles, IL) and phosphine oxide derivatives such as ethyl-2,4,6-trimethylbenzoylphenyl phosphinate (e.g. available under the trade designation TPO-L from IGM Resins USA Inc., St. Charles, IL), and bis-(2,4, 6-trimethylbenzoyl)-phenylphosphine oxide (e.g., available under the trade designation OMNIRAD 819 from IGM Resins USA Inc., St. Charles, IL).

Other useful photoinitiators include, for example, pivaloin ethyl ether, anisoin ethyl ether, anthraquinones (e.g., anthraquinone, 2-ethylanthraquinone, 1-chloroanthraquinone, 1,4-dimethylanthraquinone, 1-methoxyanthraquinone, or benzanthraquinone), halomethyltriazines, benzophenone and its derivatives, iodonium salts and sulfonium salts, titanium complexes such as bis(eta5-2,4-cyclopentadien-1-yl)-bis[2,6-difluoro-3-(1H-pyrrol-1-yl) phenyl]titanium (e.g., available under the trade designation CGI 784DC from BASF, Florham Park, NJ); halomethyl-nitrobenzenes (e.g., 4-bromomethylnitrobenzene), and combinations of photoinitiators where one component is a mono- or bis-acylphosphine oxide (e.g., available under the trade designations IRGACURE 1700, IRGACURE 1800, and IRGACURE 1850 from BASF, Florham Park, NJ, and under the trade designation OMNIRAD 4265 from IGM Resins USA Inc., St. Charles, IL).

Generally, the photoinitiator is used in amounts of 0.01 to 10 parts by weight, more typically 0.1 to 2.0, parts by weight relative to 100 parts by weight of total reactive components.

The components of the cure initiator system are present in the curable composition in amounts sufficient to permit an adequate free-radical reaction rate of curing of the curable composition upon initiation of polymerization, amounts which may be readily determined by one of ordinary skill in the relevant arts. In embodiments of the present disclosure, the curable composition commonly comprises 0.1 wt. % to 10 wt. % or 0.5 wt. % to 5 wt. % of the cure initiator system.

Additives

The curable compositions may optionally contain one or more conventional additives. Additives may include, for example, tackifiers, plasticizers, dyes, pigments, antioxidants, UV stabilizers, corrosion inhibitors, dispersing agents, wetting agents, adhesion promotors, and fillers.

Fillers useful in embodiments of the present disclosure include, for example, fillers selected from the group consisting of a micro-fibrillated polyethylene, a fumed silica, a talc, a wollastonite, an aluminosilicate clay (e.g., halloysite), phlogopite mica, calcium carbonate, kaolin clay, metal oxides (e.g., barium oxide, calcium oxide, magnesium oxide, zirconium oxide, titanium oxide, zinc oxide), nanoparticle fillers (e.g. nanosilica, nanozirconia), and combinations thereof.

Elastomeric Products

The crosslinkers of the present disclosure represented by the formula $LR_q^1$ and curable compositions including such crosslinkers may be used to form elastomeric products, such as adhesives and sealants.

Elastomeric products may be prepared by methods known to those of ordinary skill in the relevant arts, for example, by curing the curable composition disclosed herein. For example, an adhesive or sealant including a curable composition of the present disclosure may be prepared by combining a curable composition of the present disclosure with an accelerator such as the accelerator from 3M SCOTCH-WELD DP84 IONS Acrylic Adhesive (3M Company, St. Paul, Minn.), and allowing the resulting combination to cure. In some embodiments, the adhesive or sealant may include 10 parts of the curable composition and 1 part of the accelerator.

In some embodiments, the elastomeric product has a minimum ultimate elongation of at least 50%, at least 100%, at least 200%, at least 400%, at least 600%, or at least 800% and/or minimum overlap shear strength of at least 1000 psi, at least 1100 psi, at least 1200 psi, at least 1300 psi or at least 1400 psi. Tensile elongation of the elastomeric and the overlap shear that it provides are measured using the test methods in the Examples, below. In some embodiments, the elastomeric product may exhibit stretch release. In some embodiments the elastomeric product may resist hydrolysis upon aging with heat and/or humidity.

The tan delta peak in dynamic mechanical analysis ("DMA") reflects the ability of a material to store or dissipate energy. A broader tan delta peak suggests that a material can dissipate energy and survive impacts over a larger range of frequencies and/or temperatures.

In some embodiments, the elastomeric product may exhibit impact resistance of greater than 2 J, greater than 3 J, greater than 4J, or greater than 5 J using test parameters of ISO 179-1, using a 21.6 J hammer dropped from a 150.0° angle.

Elastomeric products of the present disclosure may be used, for example, to bond a first substrate to a second substrate to provide a bonded article. Many types of substrates may be bonded with elastomeric products of the present disclosure, such as metals (e.g., aluminum), plastics (e.g., a polyamide), and glasses. In some embodiments, a first substrate may be bonded to a second substrate by mixing a curable composition of the present disclosure with an accelerator to form an adhesive composition, applying the adhesive composition to at least a portion of one surface of the first substrate, covering the adhesive composition at least partially with at least a portion of one surface of the second substrate, and allowing the adhesive composition to cure. In some embodiments, the portion of one surface of the first substrate is not subjected to a surface treatment (e.g., corona, flame, abrasion) before applying the adhesive composition thereto. In some embodiments, the portion of one surface of the second substrate is not subjected to a surface treatment (e.g., corona, flame, abrasion) before contacting the adhesive composition therewith. In some embodiments the first substrate and the second substrate are different materials such as a metal and a plastic or a metal and a glass. In some embodiments, the bonded article may be, for example, an automotive component, an electronic device, or a component of an electronic device.

After curing, the curable composition yields bonded constructions displaying high adhesion, elongation, and impact resistance on a variety of substrates, even when the bonded substrate receives no surface treatment prior to bonding. Curable compositions in embodiments of the present disclosure may yield adhesives providing bonded constructions that display little to no bond-line read through, which may be particularly useful in automotive and aerospace applications, among others. Curable compositions in embodiments of the present disclosure may yield adhesives particularly suitable for use in portable electronic devices requiring tough adhesives that can survive the impact associated with drop tests. Curable compositions in embodiments of the present disclosure may provide adhesive compositions exhibiting stretch release, providing the ability to disassemble components with heat and non-wire string, both of which can enable rework of parts bonded with these adhesives. For example, the bonding of glass lens components to a metal or plastic frame, where a cured bead of these adhesives may be pulled and stretchably release from the substrates to which it is bonded, often with showing clean release with no visible adhesive residue remaining. Furthermore, the elastomeric properties of the adhesive can provide the ability to disassemble components with heat and non-wire string, such as dental floss or fishing line. For example, with the application of heat at 65° C. or less, a non-wire string can be pulled through the bonded area between two substrates, which can then be easily separated. Once the components are separated, the adhesive can be cleanly removed from either surface by pulling and stretching the adhesive, which can typically be removed in a single strand. Curable compositions in embodiments of the present disclosure may provide sealants that resist hydrolysis upon aging with heat or humidity, which may be particularly useful, for example, in applications where the sealant exposed to warm, humid conditions over prolonged periods of time.

SELECT EMBODIMENTS OF THE PRESENT DISCLOSURE

In a first embodiment provided is a crosslinker comprising:

a compound represented by the formula:

$$LR^1_q$$

wherein each $R^1$ is independently selected from a functional group represented by the formula:

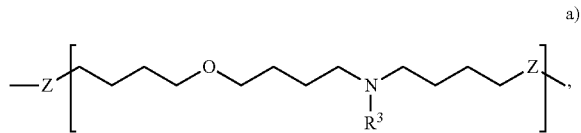

wherein:
  each $R^2$ is independently hydrogen or methyl;
  n is an integer from 1 to 5, inclusive;
  X is O, S, or NH; and
  Y is a single bond or a divalent group represented by the formula:

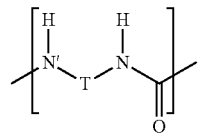

wherein:
  N' is a nitrogen bonded to the carbonyl carbon of IV; and
  T is a divalent group selected from the group consisting of a linear alkylene, a cyclic alkylene, an unsubstituted arylene, a substituted arylene, and combinations thereof;
  q is an integer of at least 2; and
  L is an q-valent organic polymer comprising:
    a monomer unit a) represented by the formula:

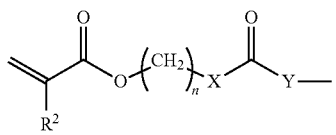

wherein $R^3$ is a hydrogen or a Z-terminated alkyl or heteroalkylene chain, wherein each Z-terminated chain may independently include a linkage selected from the group consisting of a secondary amino linkage, a tertiary amino linkage, an ether linkage, and combinations thereof, and wherein each Z is independently O, S, or NH; and
  a monomer unit b) represented by the formula:

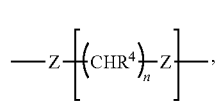

wherein n is an integer from 1 to 5, inclusive, each $R^4$ is independently hydrogen or alkyl, and each Z is independently O, S, or NH.

In a second embodiment provided is the crosslinker of the first embodiment, wherein the q-valent organic polymer L has a number average molecular weight of from 4000 to 54000 grams per mole versus a polystyrene standard.

In a third embodiment provided is the crosslinker of the first embodiment or the second embodiment, wherein the q-valent organic polymer L comprises 10 wt. % to 20 wt. % of monomer unit a) monomers.

In a fourth embodiment provided is a crosslinker of any one of the first through the third embodiments, wherein the q-valent organic polymer L comprises at least 70 wt. % of monomer unit b) monomers.

In a fifth embodiment provided is a crosslinker of any one of the first through the fourth embodiments, wherein the q-valent organic polymer L comprises less than 7 wt. %, less than 6 wt. %, less than 5 wt. %, less than 4 wt. %, less than 3 wt. %, less than 2 wt. %, less than 1 wt. %, or less than 0.5 wt. % of monomer unit a) monomers wherein $R^3$ is not hydrogen.

In a sixth embodiment is provided a curable composition comprising:
a monofunctional monomer;
a cure initiator system; and
a compound represented by the formula:

$$LR^1_q$$

wherein each $R^1$ is independently selected from a functional group represented by the formula:

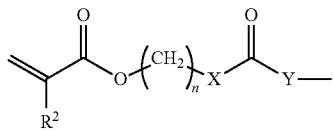

wherein:
each $R^2$ is independently hydrogen or methyl;
n is an integer from 1 to 5, inclusive;
X is O, S, or NH; and
Y is a single bond or a divalent group represented by the formula:

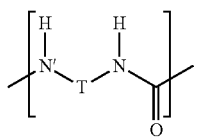

wherein:
N' is a nitrogen bonded to the carbonyl carbon of IV; and
T is a divalent group selected from the group consisting of a linear alkylene, a cyclic alkylene, an unsubstituted arylene, a substituted arylene, and combinations thereof;
q is an integer of at least 2; and
L is an q-valent organic polymer having a number average molecular weight of from 4000 to 54000 grams per mole versus a polystyrene standard and comprising a monomer unit selected from the group consisting of monomer units represented by the formulas:

a)

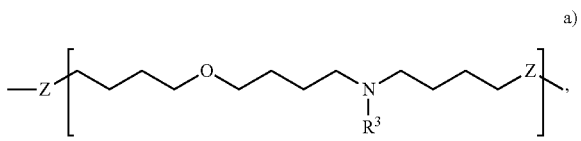

wherein $R^3$ is a hydrogen or a Z-terminated alkyl or heteroalkylene chain, wherein each Z-terminated chain may independently include a linkage selected from the group consisting of a secondary amino linkage, a tertiary amino linkage, an ether linkage, and combinations thereof, and wherein each Z is independently O, S, or NH;

b)

wherein n is an integer from 1 to 5, inclusive, each $R^4$ is independently hydrogen or alkyl, and each Z is independently O, S, or NH;

d)

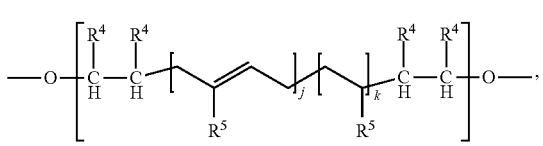

wherein j is a whole number less than or equal to 30, k is a whole number less than or equal to 30, each $R^4$ is independently hydrogen or alkyl, and each $R^5$ is independently a $C_{10}$ to $C_{15}$ alkyl group or a $C_{10}$ to $C_{15}$ alkenyl group, wherein j and k are not both zero, and wherein the moieties having the j and k subscripts are distributed randomly in the carbon chain;

e)

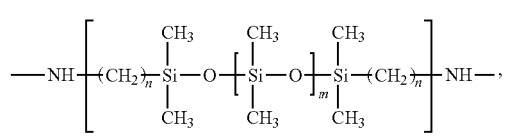

wherein m is an integer from 10 to 330 inclusive, n is an integer from 1 to 5, inclusive; and
mixtures thereof,
wherein the q-valent organic polymer L has a number average molecular weight of less than 26000 grams per mole versus a polystyrene standard of monomer unit e) if it is present.

In a seventh embodiment provided is the curable composition of the sixth embodiment, wherein the monofunctional monomer is selected from the group consisting of methyl methacrylate, 2-hydroxyethyl methacrylate, methacrylic acid, 2-(2-butoxyethoxy)ethyl methacrylate, glycerol formal methacrylate, lauryl methacrylate, cyclohexyl methacrylate, phenyl methacrylate, and combinations thereof.

In an eighth embodiment is provided the curable composition of the sixth embodiment or the seventh embodiment, wherein the cure initiator system comprises a free radical initiator system.

In a ninth embodiment provided is the curable composition of any one of the sixth through the eighth embodiments, wherein the q-valent organic polymer L comprises 10 wt. % to 20 wt. % of monomer unit a) monomers.

In a tenth embodiment provided is the curable composition of any one of the sixth through the ninth embodiments, wherein the q-valent organic polymer L further comprises a monomer unit b) represented by the formula:

b)

wherein n is an integer from 1 to 5, inclusive, each $R^4$ is independently hydrogen or alkyl, and each Z is independently 0, S, or NH.

In an eleventh embodiment provided is the curable composition of the tenth embodiment, wherein the q-valent organic polymer L comprises at least 70 wt. % of monomer unit b) monomers.

In a twelfth embodiment provided is the curable composition of any one of the sixth through the eleventh embodiments, wherein the q-valent organic polymer L comprises less than 7 wt. %, less than 6 wt. %, less than 5 wt. %, less than 4 wt. %, less than 3 wt. %, less than 2 wt. %, less than 1 wt. %, or less than 0.5 wt. % of monomer unit a) monomers wherein $R^3$ is not hydrogen.

In a thirteenth embodiment provided is the curable composition of any one of the sixth through the twelfth embodiments, wherein the q-valent organic polymer L further comprises a monomer unit selected from the group consisting of monomer units represented by the formulas:

f)
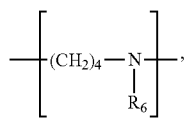

g)
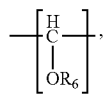

h)
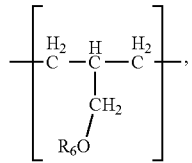

and combinations thereof, wherein each $R^6$ is independently a hydrogen, a monomer unit selected from the group consisting of monomer units a)-e) and a Z-terminated alkyl chain, wherein the Z-terminated alkyl chain may include a linkage selected from the group consisting of a secondary amino linkage, a tertiary amino linkage, an ether linkage, and combinations thereof, and wherein Z is O, S, or NH.

In a fourteenth embodiment provided is the curable composition of any one of the sixth through the thirteenth embodiments, wherein the q-valent organic polymer L further comprises a monomer unit represented by the formula:

i)
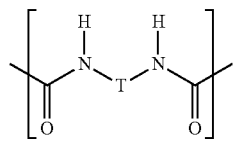

wherein T is a divalent group selected from the group consisting of a linear alkylene, a cyclic alkylene, an unsubstituted arylene, a substituted arylene, and combinations thereof.

In a fifteenth embodiment provided is the curable composition of any one of the sixth through the thirteenth embodiments, wherein the composition comprises 49 wt. % to 97 wt. % of the monofunctional monomer, 0.1 wt. % to 10 wt. % of the cure initiator system, and 2 wt. % to 60 wt. % of the compound represented by the formula $LR_q^1$.

In a sixteenth embodiment provided is the curable composition of any one of the sixth through the thirteenth embodiments, the composition further comprising a filler.

In a seventeenth embodiment provided is the curable composition of the sixteenth embodiment, wherein the filler is selected from the group consisting of a micro-fibrillated polyethylene, a fumed silica, talc, a wollastonite, an aluminosilicate clay, a phlogopite mica, calcium carbonate, a kaolin clay, and combinations thereof.

In an eighteenth embodiment provided is an elastomeric product prepared from the crosslinker of any one of the first through the fifth embodiments.

In a nineteenth embodiment provided is an elastomeric product prepared from the curable composition of any one of the sixth through the seventeenth embodiments.

In a twentieth embodiment provided is the elastomeric product of the eighteenth or nineteenth embodiment, wherein the elastomeric product has a minimum ultimate elongation of at least 50%, at least 100%, or at least 400%.

In a twenty-first embodiment provided is the elastomeric product of any one of the eighteenth to twentieth embodiments, wherein the elastomeric product provides a minimum overlap shear strength of at least 1000 psi.

In a twenty-second embodiment provided is the elastomeric product of any one of the eighteenth to twenty-first embodiments, wherein the elastomeric product is selected from the group consisting of an adhesive and a sealant.

In a twenty-third embodiment is provided a method of bonding a first substrate to a second substrate, the method comprising:
  mixing the curable composition of any one of the sixth through the seventeenth embodiments with an accelerator to form an adhesive composition;
  applying the adhesive composition to at least a portion of one surface of the first substrate;
  covering the adhesive composition at least partially with at least a portion of one surface of the second substrate; and
  allowing the adhesive composition to cure.

In a twenty-fourth embodiment is provided the method of the twenty-third embodiment, wherein 10 parts of the curable composition are mixed with 1 part of the accelerator.

In a twenty-fifth embodiment is provided the method of the twenty-third embodiment or the twenty-fourth embodiment, wherein at least one of the first substrate or the second substrate is a polyamide.

In a twenty-sixth embodiment provided is the method of any one of the twenty-third through the twenty-fifth embodiments, wherein the first substrate and the second substrate are different materials.

In a twenty-seventh embodiment provided is the method of any one of the twenty-third through the twenty-sixth embodiments, wherein the portion of one surface of the first substrate is not subjected to a surface treatment before applying the adhesive composition thereto.

In a twenty-eighth embodiment provided is a bonded article comprising the elastomeric product of any one of the eighteenth to twenty-second embodiments bonded to a substrate.

In a twenty-ninth embodiment provided is a bonded article comprising a glass lens bonded to a metal body using the elastomeric product of any one of the eighteenth to twenty-second embodiments.

In a thirtieth embodiment provided is a method of debonding a first substrate bonded to a second substrate with a bead of the elastomeric product of any one of the eighteenth to twenty-second embodiments, the method comprising:
  pulling the bead away from at least one of the first substrate or the second substrate, wherein the bead stretchably releases from at least one of the first substrate or the second substrate.

In a thirty-first embodiment provided is the method of the thirtieth embodiment, wherein the bead stretches to cleanly release from at least one of the first substrate or the second substrate.

In a thirty-second embodiment, provided is a method of debonding a first substrate bonded to a second substrate along a bond line formed by a bead of cured elastomeric product of any one of the eighteenth to twenty-second embodiments, the method comprising:
pulling the bead away from the bond line, wherein the bead stretches to cleanly release from the first and second substrates.

In a thirty-third embodiment provided is the method of any one of the thirtieth to thirty-second embodiments, wherein the bead is removed from at least one of the first substrate or the second substrate in one continuous piece.

In a thirty-fourth embodiment provided is the method of any one of the thirtieth to thirty-third embodiments, wherein the first substrate is a glass lens and the second substrate is a frame, the method comprising pulling the bead laterally away from the glass lens and frame, wherein the bead stretchably releases from the glass lens and frame.

In a thirty-fifth embodiment provided is the method of any one of the thirtieth to thirty-fourth embodiments, further comprising heating at least one of the elastomeric product, the first substrate, or the second substrate before pulling the bead of the elastomeric product.

In a thirty-sixth embodiment provided is the method of any one of the thirtieth to thirty-fifth embodiments, further comprising heating the elastomeric product before pulling the bead of the elastomeric product.

In a thirty-seventh embodiment provided is the method of any one of the thirtieth to thirty-sixth embodiments, further comprising pulling a non-metallic string through the elastomeric product between the first substrate and the second substrate to separate the first substrate and the second substrate.

In a thirty-eighth embodiment provided is the method of the thirty-seventh embodiment, wherein the non-metallic string is dental floss or fishing line.

In a thirty-ninth embodiment provided is a method of debonding a glass lens bonded to a frame with a bead of the elastomeric product of any one of the eighteenth to twenty-second embodiments, the method comprising:
pulling the bead laterally away from the glass lens and frame, wherein the bead stretchably releases from the glass lens and frame.

In a fortieth embodiment provided is the method of the thirty-ninth embodiment, further comprising:
heating the glass lens, frame, and bead prior to the pulling step.

In a forty-first embodiment, provided is the method of the thirty-ninth or fortieth embodiment, wherein the bead stretchably releases from the glass lens and frame in one continuous piece.

In a forty-second embodiment provided is the method of any one of the thirty-ninth to forty-first embodiments, further comprising pulling a non-metallic string through the elastomeric product between the glass lens and frame to separate the glass lens and frame.

In a forty-third embodiment provided is the method of the forty-second embodiment, wherein the non-metallic string is dental floss or fishing line.

Objects and advantages of this disclosure are further illustrated by the following non-limiting examples, but the particular materials and amounts thereof recited in these examples, as well as other conditions and details, should not be construed to unduly limit this disclosure.

EXAMPLES

Unless otherwise noted, all parts, percentages, ratios, etc. in the Examples and the rest of the specification are by weight.

TABLE 1

Materials

| Abbreviation | Description and Source |
|---|---|
| IEM | 2-isocyanatoethyl methacrylate obtained from Showa Denko K. K. (Tokyo, Japan) under the trade designation KARENZ MOI |
| HC-1101 | Branched poly(tetrahydrofuran) diamine with primary (1°) amine content of 7143 g/eq and total amine content of 5243 g/eq obtained from 3M Company (St. Paul, MN) under the trade designation DYNAMAR HC-1101 |
| POLYTHF 2000 | Poly(tetramethylene oxide) diol with molecular weight of approximately 2000 obtained from BASF (Florham Park, NJ) under the trade designation POLYTHF 2000 |
| TERATHANE 2900 | Poly(tetramethylene oxide) diol with molecular weight of approximately 2900 obtained from The Lycra Company (Wilmington, DE) under the trade designation TERATHANE 2900 |
| PCL H1P | Polycaprolactone diol having average molecular weight of 10,000 g/mol (OH value, KOH mg/g 13.0) obtained from Daicel USA Inc. (Fort Lee, NJ) under the trade designation PLACCEL H1P |
| F3000 | A polyfarnesene diol polymer having a molecular weight of 2720 g/mol available from TOTAL Cray Valley (Exton, PA) under the trade designation KRASOL F 3000 |
| D4000 | Amine terminated polypropylene glycol having approximate molecular weight of 4000 available from Huntsman Corporation (The Woodlands, TX) under the trade designation JEFFAMINE D-4000 |
| 1K silicone diamine | An amine-terminated polydimethylsiloxane having a number average molecular weight of approximately 1000 g/mol available from Wacker Silicones (Adrian MI) under the trade designation FLUID NH 15D |
| 5K silicone diamine | Bis(3-aminopropyldimethyl) polydimethylsiloxane having a number average molecular weight of approximately 5000 g/mol (3M Company as described in Example 2 of U.S. Pat. No. 5,214,119) |

TABLE 1-continued

Materials

| Abbreviation | Description and Source |
|---|---|
| 25K silicone diamine | Bis(3-aminopropyldimethyl) polydimethylsiloxane having a number average molecular weight of approximately 25000 g/mol (3M Company as described in Example 2 of U.S. Pat. No. 5,214,119) |
| EC-311 | Trifunctional triamine prepared by reaction of propylene oxide with a triol initiator, followed by amination of the terminal hydroxyl groups. Available from BASF (Florham Park, NJ) under the trade designation BAXXODUR EC 311 |
| PPDA-6K | α-ω-diamino poly(tetramethylene oxide) polymer having primary amine equivalent weight AEW = 2944 g/eq. and Mn = 5888 g/mol, (both determined by titration with 1N HCl) prepared as described in U.S. Pat. No. 4,833,213 |
| PPDA-9K | α-ω-diamino poly(tetramethylene oxide) polymer having primary amine equivalent weight AEW = 4653 g/eq. and Mn = 9126 g/mol, (both determined by titration with 1N HCl) prepared as described in U.S. Pat. No. 4,833,213 |
| PDT-650 | Poly(tetramethyleneglycol) dimethacrylate available from Nippon Oil & Fat Corporation (Tokyo, Japan) under the trade designation BLEMMER PDT-650 |
| DMS-R18 | Methacryloxypropyl terminated polydimethylsiloxane (MW approximately 5000) obtained from Gelest (Morrisville, PA) as product code DMS-R18 |
| DMS-R22 | Methacryloxypropyl terminated polydimethylsiloxane (MW approximately 10000) obtained from Gelest (Morrisville, PA) as product code DMS-R22 |
| DDMA | Methacrylate crosslinker obtained from methacrylate functionalization of 6000 molecular weight polyether (ethylene oxide/tetramethylene oxide 1/3-4) diol, as described in EP670341 obtained from 3M Company |
| ESS50F | Micro fibrillated polyethylene, hydrophilic grade, aspect ratio 20:1 length:diameter available from MiniFibers, Inc. (Johnson City, TN) under the trade designation SHORT STUFF ESS50F |
| CuNap | Copper naphthenate 8% in mineral spirits from Strem Chemicals (Newburyport, MA) |
| BYK-S 782 | Film forming additive from BYK Chemie (Wallingford, CT) |
| N + Cl- | Benzyl tributylammonium chloride from Sachem Americas (Austin, Texas) |
| XT100 | Methylmethacrylate-butadiene-styrene (MBS) core-shell toughening agent available form Arkema Inc. (King of Prussia, PA) under the trade designation CLEARSTRENGTH XT100 |
| TS-382 | Medium surface area fumed silica which has been surface modified with octyltrimethoxysilane available from Cabot Corp. (Billerica, MA) under the trade designation CAB-O-SIL TS-382 |
| BAYMOD N 34.52 | Acrylonitrile-butadiene rubber (NBR) with calcium stearate as separating agent available from ARLANXEO Corporation (Pittsburgh, PA) under the trade designation BAYMOD N 34.52 |
| SL300 | Hollow ceramic spheres having mean particle size of 100 micrometers from Envirospheres Pty. Ltd. (Lindfield NSW Australia) under the trade designation E-SPHERES SL300 |
| DRAGONITE | Aluminosilicate clay available from Applied Materials Inc. (Brooklyn, NY) under the trade designation DRAGONITE PURE WHITE |
| HDK H18 | Hydrophobic amorphous silica available from Wacker Silicones (München Germany) under the trade designation HDK H18 |
| MMA | Methyl methacrylate available from Evonik Performance Materials GmbH (Essen Germany) under the trade designation VISIOMER MMA |
| MEHQ | Hydroquinone monomethyl ether (4-Methoxyphenol) available from Millipore Sigma (St. Louis, MO) |
| MA | Methacrylic acid (Alfa Aesar, Tewksbury, MA) |
| NK ESTER SA | β-Methacryloyl oxyethyl hydrogen succinate obtained from Shin-Nakamura Chemical Co. LTD under the trade designation NK ESTER SA |
| PAM 200 | Phosphonate-functional methacrylate monomer available from Solvay Novecare (Cranbury, NJ) under the trade designation SIPOMER PAM-200 |
| HEMA | 2-hydroxyethyl methacrylate available from Evonik Performance Materials GmbH (Essen Germany) under the trade designation VISIOMER HEMA 97 |
| GLYFOMA | Glycerol formal methacrylate available from Evonik Performance Materials GmbH (Essen Germany) under the trade designation VISIOMER GLYFOMA |
| CHMA | Cyclohexyl methacrylate available from Evonik Performance Materials GmbH (Essen Germany) under the trade designation VISIOMER c-HMA |
| LMA | Lauryl methacrylate available from BASF (Florham Park, NJ) under the trade designation LMA 1214 F. |
| BDGMA | 2-(2-Butoxyethoxy)ethyl methacrylate available from Evonik Performance Materials GmbH (Essen Germany) under the trade designation VISIOMER BDGMA |
| SR340 | 2-Phenoxyethyl methacrylate available from SARTOMER under the trade designation SR340 |
| M1041 | Phenyl methacrylate available from Miwon North America (Exton, PA) under the trade designation MIRAMER M1041) |
| PROSTAB 5198 | Polymerization inhibitor, 4-hydroxy-2,2,6,6-tetramethyl-piperidinooxy, available from BASF (Florham Park, NJ) under the trade designation PROSTAB 5198 |
| LORD 406/19 | Acrylic adhesive from LORD Corporation (Cary, NC) under the trade designation LORD 406 ACRYLIC ADHESIVE |
| LORD 810/20G | Low read-through (LRT) acrylic adhesive from LORD Corporation (Cary, NC) under the trade designation LORD 810 ACRYLIC ADHESIVE |
| PLEXUS MA530 | A two-part methacrylate structural adhesive available from ITW Polymers Adhesives North America (Danvers, MA) under the trade designation PLEXUS MA530 |

TABLE 1-continued

Materials

| Abbreviation | Description and Source |
|---|---|
| 3M 8410 | A non-sag, tough, two-part acrylic adhesive available from 3M Company under the trade designation 3M SCOTCH-WELD DP8410NS |
| CB | Carbon black - Monarch 120 available from Cabot Corp (Billerica, MA) |

Analytical Procedures

Attenuated Total Reflectance ("ATR") FTIR Spectroscopy Measurements

ATR-FTIR measurements were recorded using a Thermo Nicolet iS50 FTIR (Thermo Fisher Scientific Co., Waltham, MA, USA) spectrometer equipped with a single-bounce diamond crystal and a deuterated triglycine sulfate detector. One drop of each liquid sample was placed directly on the surface of the diamond ATR crystal, and the evanescent wave could be absorbed by the liquid sample. The resulting attenuated radiation produced an ATR spectrum similar to a conventional absorption spectrum.

Transmission-FTIR Spectroscopy Measurements

Transmission-FTIR measurements were recorded using Thermo Nicolet iS5 System FTIR (Thermo Fisher Scientific Co., Waltham, MA) spectrometer. Samples are prepared by diluting an aliquot of a reaction in toluene to provide a solution, spreading the solution onto a salt plate, and drying under nitrogen stream.

Gel Permeation Chromatography

Polymers were analyzed by gel permeation chromatography (GPC) using Reliant GPC (Waters e2695 pump/autosampler) with Waters 2424 evaporative light scattering detector and PL-Gel-2 Columns; 300×7.5 mm each; one 3 µm Mixed-E (nominal MW range up to 30,000 Daltons) and one 5 µm Mixed-D (nominal MW range 200-400,000 Daltons). At 40° C. in tetrahydrofuran stabilized with 250 ppm of BHT relative to polystyrene standards.

Overlap Shear Test

Each sample formulation was separately loaded into the 10-part side of a 10:1 dual syringe cartridge dispenser, using the accelerator from 3M SCOTCH-WELD DP841ONS Acrylic Adhesive (3M Company) in the 1-part side of the dispenser in each case. All bonds were prepared by dispensing the sample formulation and accelerator through a static mixing tip. The resulting adhesives were used to prepare overlap shear test samples on grit-blasted aluminum substrates. Overlap shear samples were 2.54 cm×10.16 cm×0.16 cm aluminum coupons using 0.076-0.0127-mm spacer beads with a 1.27-cm overlap. The bond line was clamped with binder clips during cure and the clips were removed after 24 hours at 25° C. Testing was run on a 5000 lb (22 kN) load cell for overlap shear. The values are an average of three specimens.

Impact Test

Each sample formulation was separately loaded into the 10-part side of a 10:1 dual syringe cartridge dispenser, using the accelerator from SCOTCH-WELD DP841ONS Acrylic Adhesive (3M Company) in the 1-part side of the dispenser in each case. All bonds were prepared by dispensing the sample formulations and accelerator through a static mixing tip to adhesive compositions used to prepare impact test samples on grit-blasted aluminum substrates. Impact samples were 2.54 cm×10.16 cm×0.16 cm aluminum coupons using 0.076-0.0127-mm spacer beads with a 1.27-cm overlap. The bond line was clamped with binder clips during cure and the clips were removed after 24 hours at 25° C. The samples were tested on an Instron CP9050 Impact Pendulum with the samples held in a clamp and impacted on the edge of the bonded area. The test parameters were ISO 179-1, using a 21.6 J hammer dropped from a 150.0° angle.

Tensile Testing of Cure Films

Films of cured compositions were prepared by combining in a polypropylene Max100 DAC cup (part number 501 221 from FlackTek, Inc., Landrum, SC) 40 g of a sample formulation and 4 g accelerator from SCOTCH-WELD DP84 IONS Acrylic Adhesive (3M Company). The cup was closed with a polypropylene lid and the mixture was high-shear mixed at ambient temperature and pressure using a FlackTek, Inc. SPEEDEMIXER (DAC 400.2 VAC) for 25 seconds at 1500 rpm (revolutions per minute). The resulting mixtures were coated between silicone-treated polyester release liners at approximately 1mm thickness. The coated films were allowed to sit at room temperature a minimum of 24 hours before testing. Tensile elongation measurements were performed according to ASTM Standard D638-14 "Standard Test Method for Tensile Properties of Plastics", 2015 using a TYPE-V die for specimen cutting, and a 100 mm/minute crosshead test speed.

Dynamic Mechanical Analysis ("DMA") Test

Film samples were prepared using the films prepared for the Tensile Testing as described above. Film samples were cut to approximately 6-7 mm width×1 mm thick×50 mm length and tested on a DMAQ800 (TA Instruments Inc., New Castle, DE) using a dual cantilever fixture with the following settings: frequency=1 Hz, oscillation amplitude=15 um, and minimum oscillation force=0.02N. The film samples were equilibrated to −75° C. and held at that temperature for five minutes, followed by a temperature ramp of 3.0° C./minute to 150° C.

Preparative Example 1: Preparation of Methacryloxyurea-terminated Branched Diamine Poly(tetrahydrofuran) ("HC-1101/IEM")

DYNAMAR HC-1101 ("HC-1101") was heated at 65° C. to melt the solid material and reduce its viscosity. Melted HC-1101 (245.0 g) was charged in a 3-necked, round bottom flask equipped with distillation head, thermocouple, and overhead stirrer. The flask was sparged with nitrogen and heated to 70° C. To the highly viscous, heated HC-1101 methyl ethyl ketone (60 mL) was added with stirring. Afterwards, the same amount of methyl ethyl ketone was distilled off under vacuum to provide dried HC-1101. To the dried HC-1101, 2-isocyanatoethyl methacrylate ("IEM") (5.32 g) was added dropwise under nitrogen and stirring was continued at 70° C. for 16 hours. Isocyanate consumption was monitored by transmission-FTIR spectroscopy. The resulting material was drained at 70° C. to afford 196.2 g (78% yield) viscous, light-yellow oil, HC-1101/IEM, that solidified upon cooling to ambient temperature.

Preparative Example 2: Preparation of Methacrylate-Functional Purely Primary Poly(tetramethylene oxide) Diamines ("PPDA-6K/IEM" and "PPDA-9K/IEM")

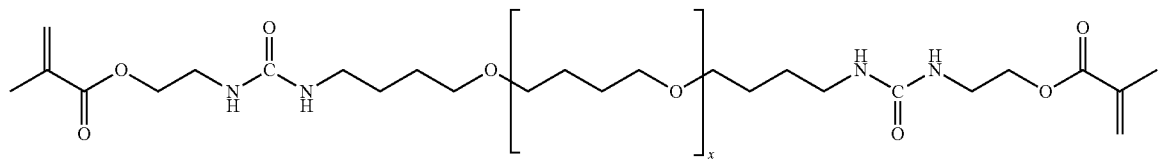

IEM-PPDA-6K (Diamine Mn = 5888 Dalton, X ≈ 81)
IEM-PPDA-9K (Diamine Mn = 9126 Dalton, X ≈ 124)

TABLE 2

PPDA-6K/IEM Reagents

| Material | Molecular Weight | Total Amine | 1° amine | Equivalents | Theoretical Charge | Actual Charge |
|---|---|---|---|---|---|---|
| PPDA-6K | 5888 g/mol | 2944 g/eq | 2944 g/eq | 0.042 eq | 122.50 g | 122.50 g |
| IEM | 155.15 g/mol | 155.15 g/eq | 155.15 g/eq | 0.042 eq | 6.46 g | 6.42 g |
| PROSTAB 5198 | | | | | 36.75 mg | 44.00 mg |

Linear polytetrahydrofuran diamine PPDA-6K (122.5 g), prepared as described in U.S. Pat. No. 4,833,213 (Leir, et al.) is added to a 500 mL resin flask equipped with thermocouple, stainless steel mechanical stirrer, and vacuum adapter. Heat the flask to 75° C. and keep under high vacuum overnight (14 hours). Refill flask with dry air and add PROSTAB 5198 (44.0 mg). Mix well and cool the flask to 50° C. Remove from heat. Add 2-isocyanatoethyl methacrylate (6.42 g) and stir in well. As the 2-isocyanatoethyl methacrylate is mixed, the previously clear viscous oil turns opaque. After 30 minutes all of the isocyanate was consumed as evidenced by transmission-FTIR analysis. Material is drained to afford 125.8 g (98% yield) of an opaque, viscous oil that solidifies upon cooling.

TABLE 3

PPDA-9K/IEM Reagents

| Material | Molecular Weight | Total amine | 1° amine | Equivalents | Theoretical Charge | Actual Charge |
|---|---|---|---|---|---|---|
| PPDA-9K | 9126 g/mol | 4563 g/eq | 4563 g/eq | 0.018 eq | 82.07 g | 82.07 g |
| IEM | 155.15 g/mol | 155.15 g/eq | 155.15 g/eq | 0.018 eq | 2.79 g | 2.85 g |
| PROSTAB 5198 | | | | | 24.62 mg | 23.30 mg |

Linear polytetrahydrofuran diamine PPDA-9K (82.07 g), prepared as described in U.S. Pat. No. 4,833,213 (Leir, et al.) is added to a 500 mL resin flask equipped with thermocouple, stainless steel mechanical stirrer, and vacuum adapter. Heat flask to 75° C. and keep under high vacuum overnight (16 hours). Refill flask with dry air and add PROSTAB 5198 (23.3 mg). Mix well and cool the flask to 50° C. Remove from heat. Add 2-isocyanatoethyl methacrylate (2.85 g) and stir in well. After 30 minutes all of the isocyanate is consumed as evident by transmission-FTIR analysis. Material is drained to afford 80.0 g (94% yield) of a viscous light-yellow oil that solidifies upon cooling.

Preparative Example 3: Synthesis of Methacryloxyurea-terminated Silicone Methacrylate ("MAUS-1K/IEM," "MAUS-5K/IEM," and "MAUS-25K/IEM") Crosslinkers

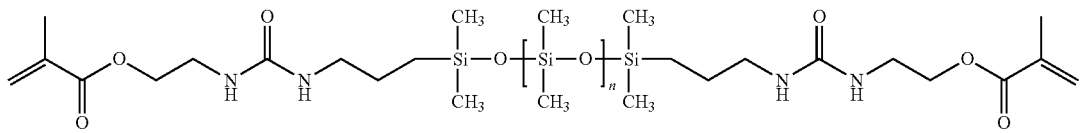

MAUS (MethAcyloxyUrea terminated Silicone)
MAUS-1K /IEM (silicone diamine Mn ~1000 Daltons)
MAUS-5K /IEM (silicone diamine Mn ~5000 Daltons)
MAUS-25K /IEM (silicone diamine Mn ~25,000 Daltons)

TABLE 4

Silicone Diamine/IEM Reagents

| Silicone Diamine Identity | Silicone Diamine Amount (g) | IEM Amount (g) |
|---|---|---|
| 1K silicone diamine* | 50.0 | 14.0 |
| 5K silicone diamine** | 50.0 | 3.0 |
| 25K silicone diamine** | 100.0 | 1.08 |

*Commercially available from Wacker Silicones (Adrian, MI) under the trade designation FLUID NH 15D.
**Prepared as described in Example 2 of U.S. Pat. No. 5,214,119 (Leir, et al.).

For each material, the silicone diamine and 2-isocyanatoethyl methacrylate ("IEM") are added to a polypropylene MAX 200 DAC cup (part number 501 220p-j from FlackTek, Inc., Landrum, SC) in the amounts as listed in Table 4. The cups are closed with a polypropylene lid and the mixtures are high-shear mixed at ambient temperature and pressure using a FlackTek, Inc. SPEEDMIXER (DAC 400.2 VAC) for one minute at 2000 rpm. After mixing, the mixtures become warm from the exothermic reaction. The mixtures are allowed to react under ambient conditions for at least 24 hours prior to use.

Preparative Example 4: Synthesis of Methacrylate-functional Poly(tetramethylene oxide) Diols ("THF 2000/IEM" and "THF 2900/IEM")

Methacrylate-functional poly(tetramethylene oxide) diols were prepared using poly(tetramethylene oxide) diols of two molecular weights, 2000 g/mol and 2900 g/mol, using the following procedure.

TABLE 5

THF 2000/IEM and THF 2900/IEM Reagents

| Diol Identity | Diol Amount (g) | IEM amount (g) |
|---|---|---|
| POLYTHF 2000 | 170.02 | 26.46 |
| TERATHANE 2900 | 180.02 | 19.28 |

The diols are heated at 70° C. to melt. The amounts of melted diol listed in Table 5 are transferred to polypropylene MAX 200 DAC cups (part number 501 220p-j from FlackTek, Inc., Landrum, SC), a separate cup for each diol, followed by addition of the amount of isocyanatoethyl methacrylate ("IEM") listed in Table 5. The cups are closed with a polypropylene lid and the mixtures are high-shear mixed at ambient temperature and pressure using a FlackTek, Inc. SPEEDMIXER (DAC 400.2 VAC) for one minute at 2000 rpm. The closed containers are held at 60° C. in an oven. The reaction mixtures are monitored over time using attenuated total reflectance ("ATR") FTIR Spectroscopy. The total reaction time is 17 hours, after which time ATR shows the disappearance of the isocyanate —NCO peak at approximately 2264 cm$^{-1}$ and the OH peaks at 3500 cm$^{-1}$ and appearance of NH peaks at 3400 cm$^1$, confirming that the reactions are completed.

Preparative Example 5: Synthesis of Methacrylate-functional PLACCEL H1P ("PCL H1P/IEM")

A 10,000 molecular weight poly(caprolactone)diol is methacrylate functionalized using the procedure described above for the poly(tetramethylene oxide) diols, where

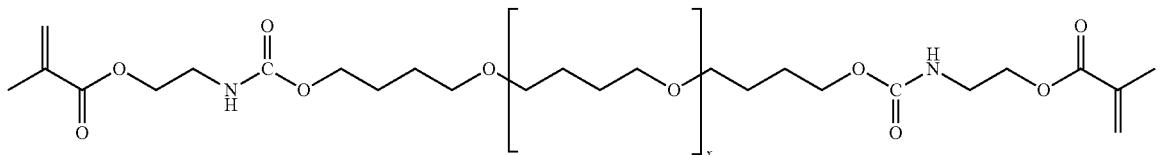

THF 2000 /IEM (X ≈ 26)
THF 2900/IEM (X ≈ 38)

PLACCEL H1P (200 g) is combined with 2-isocyanatoethyl methacrylate (7.19 g) at 80° C. for 4 hours.

Preparative Example 6: Synthesis of Methacrylate-functional D4000 ("D4000/IEM")

To a polypropylene MAX 200 DAC cup (part number 501 220p-j from FlackTek, Inc., Landrum, SC), is added JEFFAMINE D4000 (100 g), 2-isocyanatoethyl methacrylate (7.8 g), and MEHQ (0.25 g). The cup is closed with a polypropylene lid and the mixture is high-shear mixed at ambient temperature and pressure using a FlackTek, Inc. SPEEDMIXER (DAC 400.2 VAC) for one minute at 2000 rpm. After mixing, the mixture becomes warm from the exothermic reaction. The methacrylate is allowed to react under ambient conditions for at least 24 hours prior to use.

Preparative Example 7: Synthesis of Methacrylate-functional EC311 ("EC311/IEM")

To a polypropylene MAX 200 DAC cup (part number 501 220p-j from FlackTek, Inc., Landrum, SC), is added EC311 (100 g), 2-isocyanatoethyl methacrylate (8.0 g), and MEHQ (0.25 g). The cup is closed with a polypropylene lid and the mixture is high-shear mixed at ambient temperature and pressure using a FlackTek, Inc. SPEEDMIXER (DAC 400.2 VAC) for one minute at 2000 rpm. After mixing, the mixture becomes warm from the exothermic reaction. The methacrylate is allowed to react under ambient conditions for at least 24 hours prior to use.

Preparative Example 8: Synthesis of Methacrylate-functional Polyfarnesene Diol ("F3000/IEM")

To a polypropylene MAX 200 DAC cup (part number 501 220p-j from FlackTek, Inc., Landrum, SC), is added poly (farnesene) F3000 (100 g) and 2-isocyanatoethyl methacrylate (11.4 g). The cup is closed with a polypropylene lid and the mixture is high-shear mixed at ambient temperature and pressure using a FlackTek, Inc. SPEEDMIXER (DAC 400.2 VAC) for one minute at 2000 rpm. The closed container is held at 70° C. in an oven. The reaction mixture is monitored over time using attenuated total reflectance ("ATR") FTIR Spectroscopy. The total reaction time is 7 hours, after which time ATR shows the disappearance of the isocyanate —NCO peak at approximately 2264 $cm^{-1}$ and the OH peaks at 3500 $cm^{-1}$ and appearance of NH peaks at 3400 $cm^{-1}$, confirming that the reaction is completed.

Example 1. Preparation of Curable Samples 1-15

The Curable Samples 1-15 were prepared by combining the components of Table 6 in a polypropylene MAX 200 DAC cup (part number 501 220 from FlackTek, Inc.). The Curable Samples 1-15 differ based on the identity of the methacrylate crosslinker. The methacrylate crosslinker identities are listed in Table 7. After capping with a polypropylene lid, the mixtures were mixed, three times, in a SPEEDMIXER (DAC 400.2 VAC from FlackTek, Inc.) for one minute at 1500 revolutions per minute with hand stirring using a wood tongue depressor between mixes. The samples were degassed by capping with a polypropylene lid that contained a vent hole, and high-shear mixed under reduced pressure (35 Torr). Curable Samples containing the methyl methacrylate crosslinker were stored refrigerated (approximately 6° C.) until used.

TABLE 6

Formulation for Curable Samples 1-15

| Component | Parts (g) |
|---|---|
| MMA | 36.4 |
| HEMA | 2.4 |
| MA (In the material table) | 6.9 |
| NK ESTER SA | 6.9 |
| Crosslinker | 41.0 |
| N + Cl– | 0.4 |
| CuNap | 0.1 |
| TS 382 | 4.4 |
| ESS50F | 1.5 |

TABLE 7

Curable Samples 1-15 with the Identity of Crosslinker Shown

| Sample | Crosslinker |
|---|---|
| Sample-1 | HC1101/IEM |
| Sample-2 | DDMA |
| Sample-3 | D4000/IEM |
| Sample-4 | EC-311/IEM |
| Sample-5 | PPDA-6K/IEM |
| Sample-6 | PPDA-9K/IEM |
| Sample-7 | MAUS-1K/IEM |
| Sample-8 | MAUS-5K/IEM |
| Sample-9 | MAUS-25K/IEM |
| Sample-10 | THF 2900/IEM |
| Sample-11 | THF 2000/IEM |
| Sample-12 | CAPA 2402/IEM |
| Sample-13 | F3000/IEM |
| Sample-14 | PCL H1P/IEM |
| Sample-15 | PDT 650 |

Example 2. Preparation of Curable Samples 16-19

Curable Samples 16-19 were prepared by following the procedure above for preparation of Curable Samples 1-15, but using the components listed in Table 8.

TABLE 8

Composition for Curable Samples 16-19

| | Curable Sample 16 (g) | Curable Sample 17 (g) | Curable Sample 18 (g) | Curable Sample 19 (g) |
|---|---|---|---|---|
| M1041 | 32.6 | — | — | — |
| GLYFOMA | — | 32.6 | — | — |
| MMA | — | — | 32.6 | — |
| CHMA | — | — | — | 10.9 |
| SR340 | — | — | — | 10.9 |
| HPMA | — | — | — | 10.9 |
| XT100 | 9.30 | 9.29 | 9.30 | 9.30 |
| HC-1101/IEM | 37.2 | 37.2 | 37.2 | 37.2 |
| MA | 8.3 | 8.3 | 8.3 | 8.3 |
| NK ESTER SA | 8.3 | 8.3 | 8.3 | 8.3 |
| HEMA | 2.4 | 2.4 | 2.4 | 2.4 |
| N + Cl– | 0.40 | 0.40 | 0.40 | 0.40 |
| CuNap | 0.17 | 0.17 | 0.17 | 0.17 |
| ESS50F | 1.4 | 1.4 | 1.4 | 1.4 |

Example 3. Preparation of Curable Samples 20-22

Curable Samples 20-22 were prepared by following the procedure above for preparation of Curable Samples 1-15, but using the components listed in Table 9.

TABLE 9

Composition for Curable Samples 20-22

| | Sample 20 (g) | Sample 21 (g) | Sample 22 (g) |
|---|---|---|---|
| HEMA | 44.85 | 14.75 | 13.3 |
| CHMA | 10.9 | 12.05 | 10.41 |
| BDGMA | — | 28.6 | 25.57 |
| LMA | 10.9 | — | — |
| BAYMOD N 34.52 | 13.8 | 13 | 12.80 |
| HC-1101/IEM | 8.1 | 8.1 | 7.88 |
| MEHQ | 0.05 | 0.05 | 0.05 |
| N + Cl− | 1 | 1.3 | 1.28 |
| CuNap | 0.1 | 0.15 | 0.15 |
| SL300 | 0.3 | 0.3 | 0.3 |
| PAM 200 | 3.0 | 3.0 | — |
| MAA | — | — | 9.85 |
| ESS50F | 1 | 1 | 1 |
| DRAGONITE | 5 | 16.7 | 16.45 |
| HDK H18 | 1 | 1 | 1 |

Example 4: Sample Films and Bond Testing

Film coatings incorporating Samples of Tables 7-10 were prepared using the procedure described above. Testing procedures for Tensile Elongation Measurements and Dynamic Mechanical Analysis ("DMA") using the prepared film coatings are described above. Sample film testing results are shown in Tables 10 and 11 below.

TABLE 10

Results from Tensile Elongation Measurements on Films of Cured Compositions

| Example | Methacrylate Crosslinker | Peak Stress (psi) | Strain at Break (%) | Modulus (psi) |
|---|---|---|---|---|
| Sample 1 | HC1101/IEM | 3150 | 840 | 10700 |
| Sample 2 | DDMA | 2140 | 650 | 7080 |
| Sample 3 | D4000/IEM | 2250 | 570 | 10600 |
| Sample 4 | EC-311/IEM | 3040 | 380 | 15090 |
| Sample 5 | PPDA-6K/IEM | 3470 | 825 | 11790 |
| Sample 6 | PPDA-9K/IEM | 3650 | 940 | 10420 |
| Sample 7 | MAUS-1K/IEM | 4550 | 160 | 39850 |
| Sample 8 | MAUS-5K/IEM | 2470 | 55 | 14740 |
| Sample 9 | MAUS-25K/IEM | 900 | 56 | 4450 |
| Sample 10 | THF 2900/IEM | 2560 | 450 | 11450 |
| Sample 11 | THF 2000/IEM | 2880 | 350 | 13220 |
| Sample 12 | CAPA 2402/IEM | 3290 | 550 | 11640 |
| Sample 13 | F3000/IEM | 2105 | 105 | 11030 |
| Sample 14 | PCL H1P/IEM | 2570 | 390 | 17320 |
| Sample 15 | PDT 650 | 3400 | 140 | 23390 |
| Sample 16 | HC1101/IEM | 3275 | 1009 | 554 |
| Sample 17 | HC1101/IEM | 2508 | 592 | 13099 |
| Sample 18 | HC1101/IEM | 3205 | 788 | 14048 |
| Sample 19 | HC1101/IEM | 3157 | 970 | 6195 |
| Comparative Example 1 | LORD 406/19 | 3259 | 6 | 107041 |
| Comparative Example 2 | LORD 810/20G | 2022 | 19 | 21653 |
| Comparative Example 3 | PLEXUS MA530 | 3660 | 16 | 32437 |
| Comparative Example 4 | 3M 8410 | 3923 | 19 | 36290 |

TABLE 11

Dynamic Mechanical Analysis ("DMA") Data for Films of Cured Compositions

| Sample | Methacrylate Crosslinker | DMA (tan δ) (° C.) | Width at half height (° C.) |
|---|---|---|---|
| Sample 1 | HC1101/IEM | 81.9 | 74 |
| Sample 2 | DDMA | 58.1 | 84.3 |
| Sample 3 | D4000/IEM | 76.8 | 50.6 |
| Sample 4 | EC-311/IEM | 82.9 | 51.1 |
| Sample 5 | PPDA-6K/IEM | 83.8 | 56.0 |
| Sample 6 | PPDA-9K/IEM | 85.9 | 55.8 |
| Sample 7 | MAUS-1K/IEM | 106.5 | 38.5 |
| Sample 8 | MAUS-5K/IEM | 114.0 | 43.9 |
| Sample 9 | MAUS-25K/IEM | 124.5 | N.M. |
| Sample 10 | THF 2900/IEM | 72.8 | 67.2 |
| Sample 11 | THF 2000/IEM | 68.1 | 55.4 |
| Sample 12 | CAPA 2402/IEM | 73.2 | 62.9 |
| Sample 13 | F3000/IEM | 111.7 | 63.2 |
| Sample 14 | PCL H1P/IEM | 86.9 | 75.2 |
| Sample 15 | PDT 650 | 68.0 | 38.1 |
| Sample 16 | HC1101/IEM | 51.2 | 92.0 |
| Sample 17 | HC1101/IEM | 113.4 | 75 |
| Sample 18 | HC1101/IEM | 97.8 | N.M. |
| Sample 19 | HC1101/IEM | 77.5 | 70.6 |
| Sample 20 | HC1101/IEM | 73.86 | 71.88 |
| Sample 21 | HC1101/IEM | 30.24 | 40.15 |
| Sample 22 | HC1101/IEM | 79.01 | 57.31 |
| Comparative Example 1 | LORD 406 | 68.36 | 44.55 |
| Comparative Example 2 | LORD 810 | 46.34 | 32.64 |
| Comparative Example 3 | Plexus MA530 | 88.35 | 25.72 |
| Comparative Example 4 | 3M 8410 | 93.84 | 34.88 |

N.M. - data was too broad to measure

Bonds incorporating Samples of Tables 7-10 were prepared between aluminum coupons using the procedure described above. Testing procedures for Overlap Shear and Impact are described above with the testing results shown in Tables 12 and 13 below.

TABLE 12

Overlap Shear Values to Grit-blasted Aluminum

| Sample | Crosslinker | Overlap Shear (psi) |
|---|---|---|
| Sample 1 | HC1101/IEM | 1440 |
| Sample 2 | DDMA | 1390 |
| Sample 3 | D4000/IEM | 1470 |
| Sample 4 | EC-311/IEM | 1870 |
| Sample 5 | PPDA-6K/IEM | 1690 |
| Sample 6 | PPDA-9K/IEM | 1420 |
| Sample 7 | MAUS-1K/IEM | 2680 |
| Sample 8 | MAUS-5K/IEM | 2010 |
| Sample 9 | MAUS-25K/IEM | 850 |
| Sample 10 | THF 2900/IEM | 1720 |
| Sample 11 | THF 2000/IEM | 1900 |
| Sample 12 | CAPA 2402/IEM | 2420 |
| Sample 13 | F3000/IEM | 2410 |
| Sample 14 | PCL H1P/IEM | 2460 |
| Sample 15 | PDT 650 | 2220 |
| Sample 16 | HC1101/IEM | 1648 |
| Sample 17 | HC1101/IEM | 2337 |
| Sample 18 | HC1101/IEM | 1901 |
| Sample 19 | HC1101/IEM | 1893 |
| Comparative Example 1 | LORD 406/19 | 2610 |
| Comparative Example 2 | LORD 810/20G | 1176 |
| Comparative Example 3 | Plexus MA530 | 2481 |

TABLE 12-continued

Overlap Shear Values to Grit-blasted Aluminum

| Sample | Crosslinker | Overlap Shear (psi) |
|---|---|---|
| Comparative Example 4 | 3M 8410 | 3318 |

TABLE 13

Impact Energy Measurements

| | | Impact Energy (Joules) | | | |
|---|---|---|---|---|---|
| Sample | Crosslinker | Specimen 1 | Specimen 2 | Specimen 3 | Average |
| Sample 1 | HC1101/IEM | 5.3 | 4.7 | 5.2 | 5.1 |
| Sample 2 | DDMA | 4.0 | 4.1 | 4.1 | 4.1 |
| Sample 3 | D4000/IEM | 3.9 | 4 | 3.7 | 3.9 |
| Sample 4 | EC-311/IEM | 15.4 | 16.8 | 6.1 | 12.7 |
| Sample 5 | PPDA-6K/IEM | 5.0 | 5.2 | 4.6 | 4.9 |
| Sample 6 | PPDA-9K/IEM | 5.0 | 5.0 | 4.7 | 4.9 |
| Sample 7 | MAUS-1K/IEM | 5.5 | 3.5 | 3.6 | 4.2 |
| Sample 8 | MAUS-5K/IEM | 2.3 | 2.8 | 2.4 | 2.5 |
| Sample 9 | MAUS-25K/IEM | 0.7 | 0.6 | 0.6 | 0.6 |
| Sample 10 | THF 2900/IEM | 4.6 | 4.7 | 4.8 | 4.7 |
| Sample 11 | THF 2000/IEM | 4.4 | 4.5 | 4.6 | 4.5 |
| Sample 12 | CAPA 2402/IEM | 13.6 | 19.3 | 4.4 | 12.4 |
| Sample 13 | F3000/IEM | 17.0 | 5.8 | 4.9 | 9.2 |
| Sample 14 | PCL H1P/IEM | 2.9 | 2.5 | 3.1 | 2.8 |
| Sample 15 | PDT 650 | 2.7 | 5.4 | 7.6 | 5.2 |
| Sample 16 | HC1101/IEM | 6.1 | 6.4 | 4.8 | 5.8 |
| Sample 17 | HC1101/IEM | 7.1 | 6.3 | 5.8 | 6.4 |
| Sample 18 | HC1101/IEM | 6.5 | 5.9 | 5.5 | 6.0 |
| Sample 19 | HC1101/IEM | 6.7 | 5.8 | 4.9 | 5.8 |
| Comparative Example 1 | LORD 406 | 2.6 | 1.7 | 2.3 | 2.2 |
| Comparative Example 2 | LORD 810 | 2.5 | 3.0 | 3.1 | 2.9 |
| Comparative Example 3 | Plexus MA530 | 1.8 | 1.9 | 2.0 | 1.9 |
| Comparative Example 4 | 3M 8410 | 6.8 | 5.7 | 4.4 | 5.6 |

The data in Tables 10 through 13 show that the Sample formulations containing the crosslinkers of the present disclosure can yield adhesives having elongation greater than 400% while still maintaining good structural adhesion and impact resistance.

It has been surprisingly found that formulations having very high elongation of approximately or greater than 400% exhibited stretch release, which could enable rework of parts bonded with these adhesives. Materials having elongation values lower than 400% will tend to break when stretched. Moreover, adhesives having both low modulus and high elongation may desirably provide low bond-line read-through when used to bond materials to each other.

Example 5. Glass/Glass Overlap Sheer ("OLS") Aging Test

Sample formulation 21 prepared as described above was loaded into the 10-part side of a 10:1 dual syringe cartridge dispenser, using the accelerator from 3M SCOTCH-WELD DP84 IONS Acrylic Adhesive (3M Company) in the 1-part side of the dispenser. All bonds were prepared by dispensing the adhesive composition and accelerator through a static mixing tip. The adhesives were used to prepare overlap shear aging test samples on glass substrates prepared with an isopropanol wipe. Overlap shear samples having 0.5 inch (1.27 cm) overlap were prepared on glass coupons (¼" (0.635 mm) thick×1" (25.4 mm) wide×4" (101.6 mm) long). The bond line was clamped with binder clips during cure and the clips were removed after 24 hours at 25° C. The control glass test samples 1 and 2 were conditioned at 77° F. (25° C.) and 50% relative humidity with measurements taken at 3 weeks on a 5000 lb (22 kN) load cell for overlap shear ("OLS Aging Result"). The glass test samples 3-8 were conditioned at 150° F. (66° C.) and 85% relative humidity with measurements taken at one week, two weeks, and three weeks on a 5000 lb (22 kN) load cell for overlap shear. The values are an average of three specimens. Data are shown in Table 14.

TABLE 14

Overlap Shear Results with Heat and Humidity Aging

| Overlap Shear Aging Test Sample | Aging Time | OLS Aging Result (psi) |
|---|---|---|
| 1 | 3 weeks | 289 |
| 2 | 3 weeks | 290 |
| 3 | 1 week | 230 |
| 4 | 1 week | 298 |
| 5 | 2 weeks | 258 |
| 6 | 2 weeks | 278 |
| 7 | 3 weeks | 320 |
| 8 | 3 weeks | 151 |

It was expected that a methacrylate-monomer based adhesive, such as an adhesive prepared with Sample formulation 21, would hydrolyze upon heat/humidity aging, i.e., 150° F. (66° C.) and 85% relative humidity, and thus lower the OLS values as the aging continued. Surprisingly, the data in Table 14 show that an adhesive prepared using Sample formulation 21 does not behave in this manner and suggest that adhesive formulations of the present disclosure may have utility as sealants.

Example 6. Plastic/Plastic Overlap Sheer Test

Sample 22 prepared as described above was loaded into the 10-part side of a 10:1 dual syringe cartridge dispenser, using the accelerator from 3M SCOTCH-WELD DP841ONS Acrylic Adhesive (3M Company) in the 1-part side of the dispenser. Three commercially available acrylic adhesives, 3M SCOTCH-WELD DP841ONS, 3M SCOTCH-WELD DP8010 Blue, and 3M SCOTCH-WELD DP8805 Green (all from 3M Company) were also evaluated. For each formulation, bonds were prepared by dispensing the adhesive composition and accelerator through a static mixing tip. The adhesives were used to prepare 0.5 inch (1.27 cm) overlap shear test samples on Nylon 6,6 substrates (0.318 cm×2.54 cm×10.16 cm) from Plastics Internationals (Eden Prairie, MN) prepared with an isopropanol wipe. For Sample 22, glass spacer beads (76-127 micrometers) were applied to the adhesive to ensure uniform bond line thickness. Three 0.5 inch (1.27 cm) overlap shear test specimens were prepared for each adhesive formulation, with two small binder clips (Model 10667CT from Staples Inc. Framingham, MA) applied to each specimen to hold the substrates in place. The clips were removed after 24 hours at 25° C., and the overlap shear testing was performed as described above using a grip speed of 2.0 inches (5.08 cm) per minute, with the data recorded as an average of three values as shown in Table 14, below.

TABLE 15

Overlap Shear Values on Nylon 6,6

| Sample | Adhesive | Overlap Shear (psi) | Failure Mode |
|---|---|---|---|
| Sample 22 | Sample 22 | 1402 | substrate |
| Comparative example 5 | 3M DP 8410 NS | 151 | adhesive |
| Comparative example 6 | 3M DP 8010 Blue | 232 | adhesive |
| Comparative example 7 | 3M DP 8805 Green | 526 | adhesive |

Most commercially available epoxy, polyurethane, and acrylic adhesives (and hybrids thereof) cannot bond to Nylon/polyamide substrates with "structural" bond strength (i.e., >1000 psi in a typical overlap shear test). This is especially true if the substrate receives no surface treatment (e.g., corona, flame, abrasion) prior to bonding. As the data in Table 15 demonstrate, however, the Sample 22 adhesive including a crosslinker of the present disclosure shows surprisingly high bond strength (i.e., 1402 psi) when bonded to Nylon 6,6 substrates in the absence of any surface treatment.

Examples 7 to 9. Glass Bond (and Debond) to Aluminum Panel

TABLE 16

Composition for Examples 7 to 9

| Example 7 | (g) |
|---|---|
| HEMA | 13.1 |
| CHMA | 12.4 |
| SR340 | 12.4 |
| HC-1101/IEM | 32.2 |
| XT100 | 11.6 |
| N + Cl- | 0.4 |
| CuNap | 0.1 |
| MAA | 13.7 |
| NK Ester SA | 3.4 |
| BYK-S 782 | .4 |
| CB | 0.2 |

| | % |
|---|---|
| Example 8 | |
| XT100 | 11.52 |
| CHMA | 12.50 |
| HEMA | 13.27 |
| SR340 | 12.50 |
| HC1101/IEM | 31.99 |
| MA | 13.65 |
| NK Ester SA | 3.41 |
| N + Cl- | 0.51 |
| CB | 0.17 |
| BYK 782 | 0.43 |
| CuNap | 0.05 |
| | 100.00 |
| Example 9 | |
| XT100 | 11.51 |
| MMA | 13.43 |
| HEMA | 5.03 |
| SR340 | 19.83 |
| HC1101/IEM | 31.98 |
| MA | 13.64 |
| NK Ester SA | 3.41 |
| N + Cl- | 0.51 |
| CB | 0.17 |
| BYK 782 | 0.43 |
| CuNap | 0.05 |
| | 100.00 |

Examples 7, 8, and 9 as described above were loaded into the 10-part side of a 10:1 dual syringe cartridge dispenser, using the accelerator from SCOTCH-WELD D841ONS Acrylic Adhesive (3M Company). This adhesive was used to bond a 152.4 mm×101.6 mm×0.8 mm aluminum panel (available from ACT Test Panels, Hillsdale, MI) to 152.4-mm×76.2-mm×0.7-mm thick borosilicate glass (Eagle XG, Swift Glass, New York) for Example 7 or to 158-mm×77-mm×0.7-mm "CORNING GORILLA" glass (Corning, Inc., Corning, New York) for Examples 8 and 9. Two layers of vinyl tape (Vinyl tape 471, 3M company) were used to control the adhesive bead height to 0.25 mm. The adhesive was dispensed onto the aluminum panel using automated dispense equipment available from NuStar Instruments (Suzhou New Star Precision Machinery Co., Suzhou, China) with the adhesive bead 4 mm from the edge of the perimeter of the glass. The volume of the adhesive bead was controlled to achieve a width of 1.0 mm after bonding. After the bead was dispensed on the aluminum panel, the glass panel was carefully placed tape side down on top of it, and a 1-kg weight was then placed near the top and bottom end of the panel to maintain contact between the panels at the tape interface and assure the adhesive bondline gap was 0.25 mm. The adhesive was allowed to cure for at least 72 hours at room temperature, resulting in the glass adhesively bonded to the aluminum panel, and then the weights were removed.

To effect debonding, the sample including Example 7 was then placed on a hot plate set to 65° C. After 3 minutes, the back of a thin razor blade was used to egress a small tab of the adhesive bead. Using tweezers, the tab was then pulled at an approximately 90° angle to the adhesive bead, outward from the sandwich of aluminum and glass. The adhesive stretched and cleanly released from the bond line and was removed in a single piece with no breakage during the removal. By "cleanly released", it is meant that there was essentially no visible adhesive residue present on either surface after the adhesive was pulled away from the substrates.

The glass bonded to aluminum substrates using the compositions of Examples 8 and 9 were placed on and taped to a hotplate set to 65° C. After allowing the bonded substrate several minutes to heat up, a piece of Oral B Glide dental floss (Proctor & Gamble Company, Cincinnati, Ohio) was inserted at one of the bonded corners. The floss was then pulled through the entirety of the bonded area and the glass easily removed. Residue of adhesive were then cleanly peeled off in long strands.

The elongation and lower modulus at elevated temperatures of the adhesive of the present disclosure allows disassembly of components with heat and non-wire string, and because of the high elongation, the residual adhesives can be easily removed.

All cited references, patents, and patent applications in the above application for letters patent are herein incorporated by reference in their entirety in a consistent manner. In the event of inconsistencies or contradictions between portions of the incorporated references and this application, the information in the preceding description shall control. The preceding description, given in order to enable one of ordinary skill in the art to practice the claimed disclosure, is not to be construed as limiting the scope of the disclosure, which is defined by the claims and all equivalents thereto.

What is claimed is:

1. A crosslinker comprising:
a compound represented by the formula:

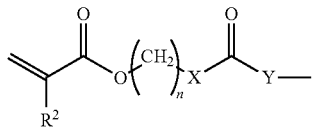

wherein each $R^1$ is independently selected from a functional group represented by the formula:

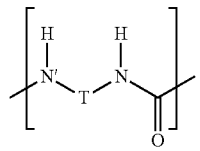

wherein:
each $R^2$ is independently hydrogen or methyl;
n is an integer from 1 to 5, inclusive;
X is O, S, or NH; and
Y is a single bond or a divalent group represented by the formula:

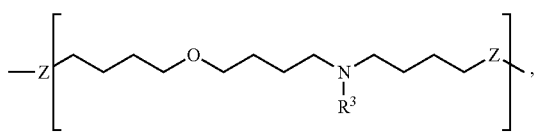

wherein:
N' is a nitrogen bonded to the carbonyl carbon of $R^1$; and
T is a divalent group selected from the group consisting of a linear alkylene, a cyclic alkylene, an unsubstituted arylene, a substituted arylene, and combinations thereof;
q is an integer of at least 2; and
L is an q-valent organic polymer comprising:
a monomer unit a) represented by the formula:

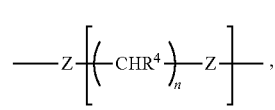

wherein $R^3$ is a hydrogen or a Z-terminated alkyl or heteroalkylene chain, wherein each Z-terminated chain may independently include a linkage selected from the group consisting of a secondary amino linkage, a tertiary amino linkage, an ether linkage, and combinations thereof, and wherein each Z is independently O, S, or NH; and a monomer unit b) represented by the formula:

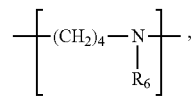

wherein n is an integer from 1 to 5, inclusive, each $R^4$ is independently hydrogen or alkyl, and each Z is independently O, S, or NH.

2. The crosslinker of claim 1, wherein the q-valent organic polymer L has a number average molecular weight of from 4000 to 54000 grams per mole versus a polystyrene standard.

3. A curable composition comprising:
a monofunctional monomer;
a cure initiator system; and
the crosslinker of claim 1.

4. The curable composition of claim 3, wherein the monofunctional monomer is selected from the group consisting of methyl methacrylate, 2-hydroxyethyl methacrylate, methacrylic acid, 2-(2-butoxyethoxy)ethyl methacrylate, glycerol formal methacrylate, lauryl methacrylate, cyclohexyl methacrylate, phenyl methacrylate, and combinations thereof.

5. The curable composition of claim 3, wherein the q-valent organic polymer L further comprises a monomer unit selected from the group consisting of monomer units represented by the formulas:

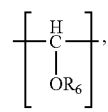

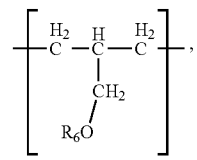

and combinations thereof, wherein
each $R^6$ is independently a hydrogen, a monomer unit selected from the group consisting of monomer units a)-e) and a Z-terminated alkyl chain, wherein the Z-terminated alkyl chain may include a linkage selected from the group consisting of a secondary amino linkage, a tertiary amino linkage, an ether linkage, and combinations thereof, and wherein Z is O, S, or NH.

6. The curable composition of claim 3, wherein the q-valent organic polymer L further comprises a monomer unit represented by the formula:

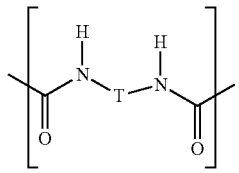

i)

wherein T is a divalent group selected from the group consisting of a linear alkylene, a cyclic alkylene, an unsubstituted arylene, a substituted arylene, and combinations thereof.

7. The curable composition of claim 3, the composition further comprising a filler selected from the group consisting of a micro-fibrillated polyethylene, a fumed silica, talc, a wollastonite, an aluminosilicate clay, a phlogopite mica, calcium carbonate, a kaolin clay, and combinations thereof.

8. An elastomeric product prepared from at least one of the crosslinker of claim 1, wherein the elastomeric product has a minimum ultimate elongation of at least 50%.

9. A method of bonding a first substrate to a second substrate, the method comprising:
mixing the curable composition of claim 3 with an accelerator to form an adhesive composition;
applying the adhesive composition to at least a portion of one surface of the first substrate;
covering the adhesive composition at least partially with at least a portion of one surface of the second substrate; and
allowing the adhesive composition to cure.

10. The method of claim 9, wherein the portion of one surface of the first substrate is not subjected to a surface treatment before applying the adhesive composition thereto.

11. A bonded article comprising the elastomeric product of claim 8 bonded to a substrate.

12. The bonded article of claim 11, comprising a glass lens bonded to a metal body using the elastomeric product.

13. A method of debonding a first substrate bonded to a second substrate with a bead of the elastomeric product of claim 8, the method comprising:
pulling the bead away from at least one of the first or second substrates, wherein the bead stretchably releases from at least one of the first substrate or the second substrate.

14. The method of claim 13, further comprising:
heating at least one of the elastomeric product, the first substrate, or the second substrate before pulling the bead away from at least one of the first substrate or the second substrate.

15. The method of claim 13, further comprising pulling a non-metallic string through the elastomeric product between the first substrate and the second substrate to separate the first substrate and the second substrate.

16. The curable composition of claim 3, wherein the q-valent organic polymer L comprises at least 70 wt. % of monomer unit b) monomers.

17. The curable composition of claim 3, wherein the q-valent organic polymer L comprises 10 wt. % to 20 wt. % of monomer unit a) monomers.

18. The crosslinker of claim 1, wherein the q-valent organic polymer L comprises at least 70 wt. % of monomer unit b) monomers.

19. The crosslinker of claim 1, wherein the q-valent organic polymer L comprises 10 wt. % to 20 wt. % of monomer unit a) monomers.

20. The crosslinker of claim 1, wherein Y is a single bond.

* * * * *